US012675343B2

(12) United States Patent
Shveidel et al.

(10) Patent No.: US 12,675,343 B2
(45) Date of Patent: Jul. 7, 2026

(54) FAIR SPINLOCK WITH PROTECTION AGAINST THREAD PREEMPTION

(71) Applicant: Dell Products L.P., Hopkinton, MA (US)

(72) Inventors: Vladimir Shveidel, Pardes-Hana (IL); Roy Koren, Kfar Saba (IL); Shaoqin Gong, Beijing (CN); Zhongyu Kang, Hegang (CN)

(73) Assignee: Dell Products L.P., Hopkinton, MA (US)

( * ) Notice: Subject to any disclaimer, the term of this patent is extended or adjusted under 35 U.S.C. 154(b) by 60 days.

(21) Appl. No.: 18/809,994

(22) Filed: Aug. 20, 2024

(65) Prior Publication Data

US 2026/0056807 A1     Feb. 26, 2026

(51) Int. Cl.
*G06F 9/52* (2006.01)
*G06F 9/48* (2006.01)

(52) U.S. Cl.
CPC ............ *G06F 9/526* (2013.01); *G06F 9/4881* (2013.01); *G06F 9/52* (2013.01); *G06F 9/524* (2013.01)

(58) Field of Classification Search
None
See application file for complete search history.

(56) References Cited

U.S. PATENT DOCUMENTS 5,966,543 A * 10/1999 Hartner ..................... G06F 9/52
                                                710/48
6,779,090 B2 * 8/2004 McKenney ............. G06F 9/526
                                                710/200

8,144,156 B1 * 3/2012 Baldwin ............... G06F 9/3879
                                                345/501
2007/0022429 A1 * 1/2007 Rosenbluth ............... G06F 9/52
                                                718/108
2016/0139966 A1 * 5/2016 Greco ................... G06F 9/4881
                                                718/106
2021/0216378 A1 * 7/2021 Jonsson ..................... G06F 9/52
2023/0052672 A1 * 2/2023 Ochs .................. G06F 13/4027

OTHER PUBLICATIONS https://en.wikipedia.org/w/index.php?title=Ticket_lock&oldid=1196092617, May 28, 2024.
Solihin, Yan (2009). Fundamentals of parallel computer architecture: multichip and multicore systems. Solihin Pub. pp. 262-269. ISBN 978-0-9841630-0-7.

* cited by examiner

*Primary Examiner* — Michael Sun
(74) *Attorney, Agent, or Firm* — BainwoodHuang

(57)     ABSTRACT

Techniques can include: thread TH1 acquiring a spinlock; while TH1 holds the spinlock, adding threads TH2 and TH3 to a wait queue based on a FIFO (first in first out) ordering in which threads attempt to acquire the spinlock, where TH1, TH2 and TH3 respectively have positions P1, P2 and P3 in the FIFO ordering; while TH1 holds the spinlock, preempting TH2; while TH2 is inactive and waiting at P2 in the FIFO ordering of the queue, TH1 releasing the spinlock; detecting that the spinlock is free and that TH3 is waiting in the queue at P3, where TH2 is next, in the FIFO ordering of threads in the queue, to acquire the spinlock after released by TH1; and responsive to said detecting, performing first processing including: cancelling the second position or index P2 of TH2 in the FIFO ordering; and TH3 acquiring the spinlock.

15 Claims, 10 Drawing Sheets

100

200

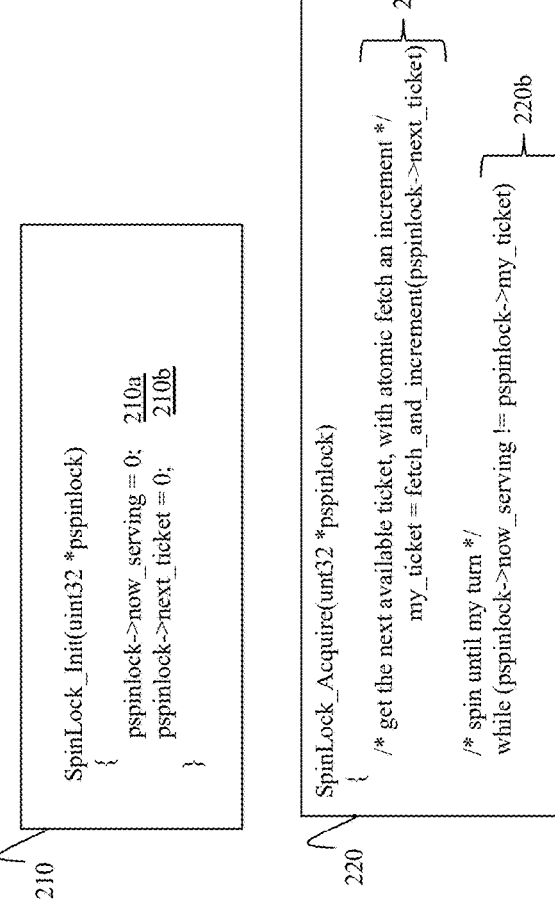

210

```
SpinLock_Init(uint32 *pspinlock)
{
    pspinlock->now_serving = 0;     210a
    pspinlock->next_ticket = 0;     210b
    ~;
}
```

220

```
SpinLock_Acquire(uint32 *pspinlock)
{
    /* get the next available ticket, with atomic fetch an increment */
        my_ticket = fetch_and_increment(pspinlock->next_ticket)      220a /* spin until my turn */
    while (pspinlock->now_serving != pspinlock->my_ticket)      220b pause.
    ~;
}
```

230

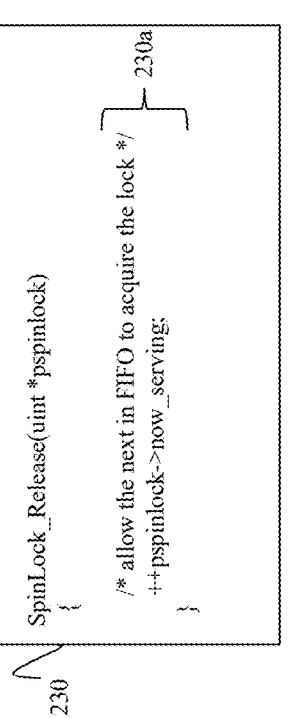

```
SpinLock_Release(uint *pspinlock)
{
    /* allow the next in FIFO to acquire the lock */
    ++pspinlock->now_serving;      230a
    ~;
}
```

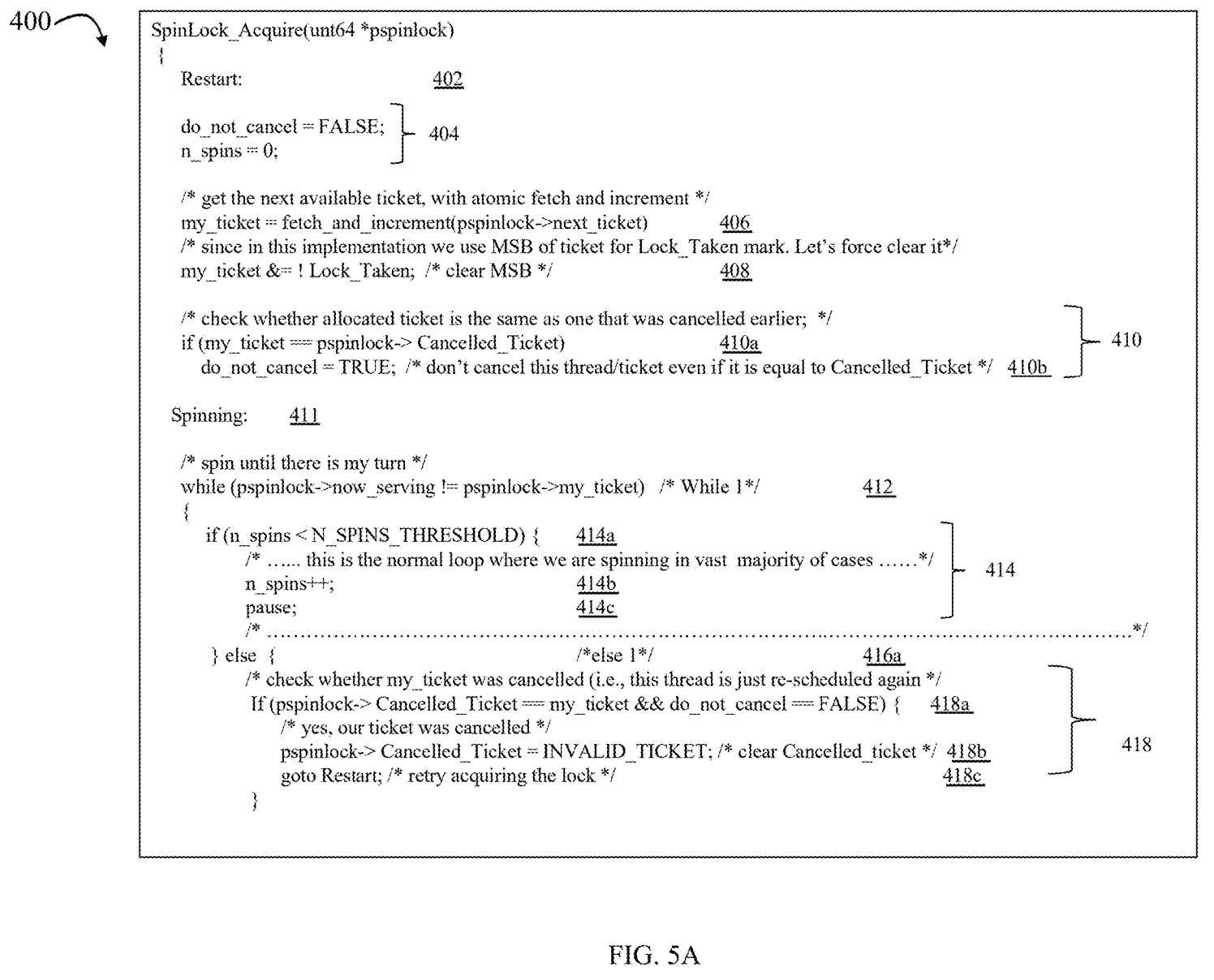

```
SpinLock_Acquire(unt64 *pspinlock)
{
Restart:                              402 do_not_cancel = FALSE;      ]
n_spins = 0;                    } 404

/* get the next available ticket, with atomic fetch and increment */
my_ticket = fetch_and_increment(pspinlock->next_ticket)      406
/* since in this implementation we use MSB of ticket for Lock_Taken mark. Let's force clear it*/
my_ticket &== ! Lock_Taken; /* clear MSB */      408

/* check whether allocated ticket is the same as one that was cancelled earlier; */
if (my_ticket == pspinlock-> Cancelled_Ticket)      410a
    do_not_cancel = TRUE; /* don't cancel this thread/ticket even if it is equal to Cancelled_Ticket */  410b     } 410

Spinning:      411

/* spin until there is my turn */
while (pspinlock->now_serving != pspinlock->my_ticket)   /* While 1*/      412
{
    if (n_spins < N_SPINS_THRESHOLD) {      414a
        /* ...... this is the normal loop where we are spinning in vast majority of cases ......*/  ] } 414
        n_spins++;      414b
        pause;      414c
        /* .........
    } else {                  /*else 1*/
        /* check whether my_ticket was cancelled (i.e., this thread is just re-scheduled again */  416a
        If (pspinlock-> Cancelled_Ticket == my_ticket && do_not_cancel == FALSE) {      418a
            /* yes, our ticket was cancelled */
            pspinlock-> Cancelled_Ticket = INVALID_TICKET; /* clear Cancelled_ticket */  418b     } 418
            goto Restart; /* retry acquiring the lock */      418c
        }
```

FIG. 5A

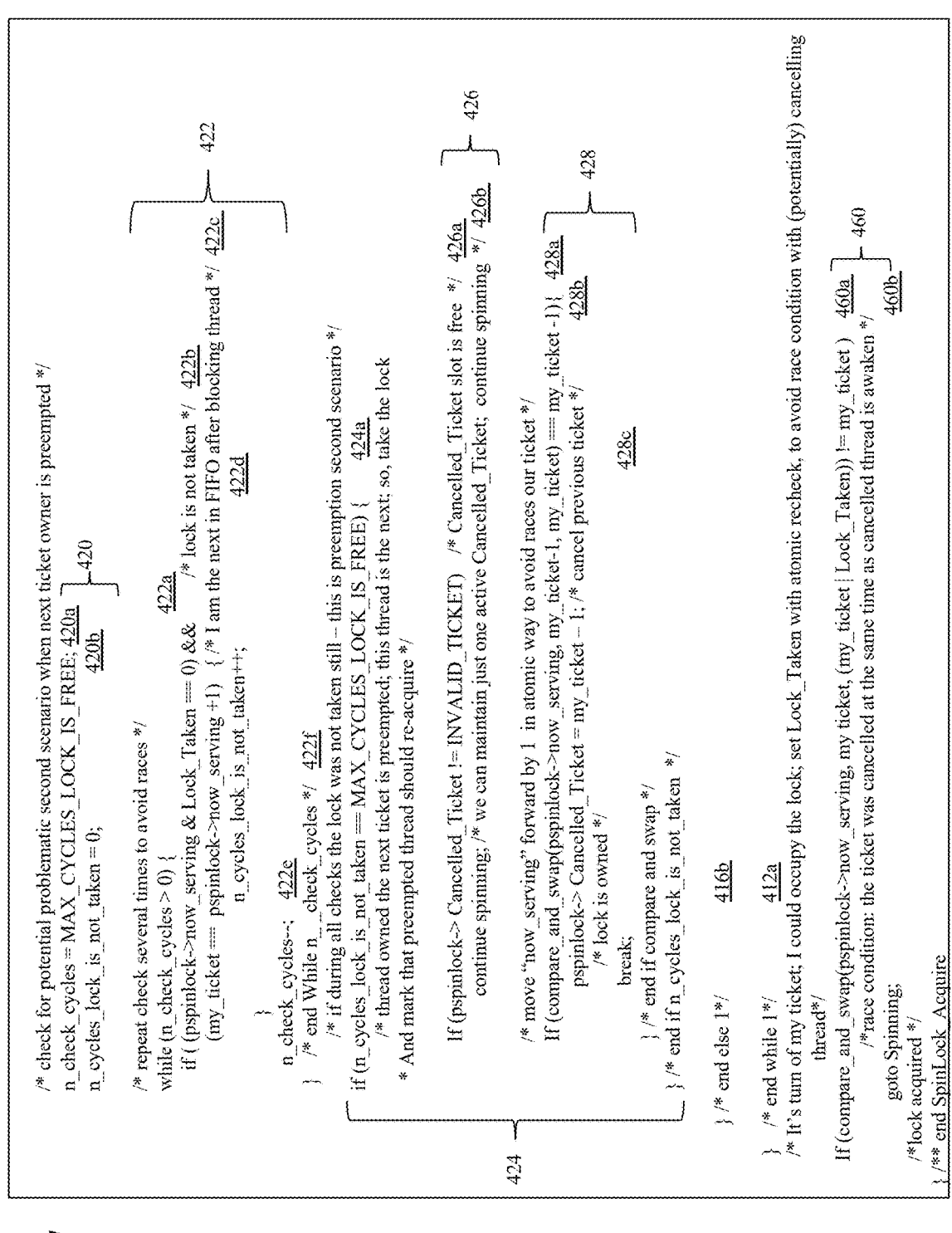

```
/* check for potential problematic second scenario when next ticket owner is preempted */
n_check_cycles = MAX_CYCLES_LOCK_IS_FREE; 420a
n_cycles_lock_is_not_taken = 0;          420b              420

/* repeat check several times to avoid races */
while (n_check_cycles > 0) {        422a
if ( (pspinlock->now_serving & Lock_Taken == 0) &&       /* lock is not taken */ 422b
     (my_ticket == pspinlock->now_serving +1)  { /* I am the next in FIFO after blocking thread */ 422c
          n_cycles_lock_is_not_taken++;          422d              422

}
n_check_cycles--;    422e
} /* end While n_check_cycles */ 422f
/* if during all checks the lock was not taken still -- this is preemption second scenario */
if (n_cycles_lock_is_not_taken == MAX_CYCLES_LOCK_IS_FREE) {     424a
          /* thread owned the next ticket is preempted; this thread is the next; so, take the lock
          * And mark that preempted thread should re-acquire */

If (pspinlock-> Cancelled_Ticket != INVALID_TICKET)   /* Cancelled_Ticket slot is free */    426a
          continue spinning; /* we can maintain just one active Cancelled_Ticket; continue spinning */ 426b    426

/* move "now_serving" forward by 1 in atomic way to avoid races our ticket */
If (compare_and_swap(pspinlock->now_serving, my_ticket-1, my_ticket) == my_ticket -1) {  428a
          pspinlock-> Cancelled_Ticket = my_ticket – 1; /* cancel previous ticket */    428b
          /* lock is owned */                                          428c
          break;
     } /* end if compare and swap */
} /* end if n_cycles_lock_is_not_taken */

} /* end else 1*/   416b

} /* end while 1*/    412a
/* It's turn of my ticket; I could occupy the lock; set Lock_Taken with atomic recheck, to avoid race condition with (potentially) cancelling
          thread*/
If (compare_and_swap(pspinlock->now_serving, my_ticket, (my_ticket | Lock_Taken)) != my_ticket )   460a
          /*race condition: the ticket was cancelled at the same time as cancelled thread is awaken */    460b   460
     goto Spinning;
/*lock acquired */
} /** end SpinLock_Acquire
```

```
SpinLock_Release(uint64 *pspinlock)
{
    /* move forward "now_serving" (handle overflow); allow the next in FIFO to acquire the lock */
    pspinlock->now_serving = (pspinlock->now_serving + 1) & ! Lock_Taken; 502
}
```

Thread 3 acquires and holds the spinlock and executes code of the corresponding critical section of code associated with the spinlock. Thread 3 acquires the spinlock after invoking and returning from SpinLock_Acquire. As noted below, thread 3 can be assigned position or index =3 in the FIFO ordering in which threads attempt to acquire the spinlock. The state ST1 of thread 3 acquiring or holding the spinlock can be denoted by i) now_serving =3, and ii) Lock_Taken = 1 or true, where now_serving and Lock_Taken can be accordingly updated in SpinLock_Acquire as executed by thread 3 prior to returning from SpinLock_Acquire.

604

While thread 3 is the current spinlock holder, 3 other threads – thread 4, thread 5, and thread 6 – attempt to acquire the spinlock but cannot since the spinlock is not free and is currently held by thread 3. As a result, the 3 threads wait to acquire the spinlock while executing code of the SpinLock_Acquire routine. The FIFO ordering in which the threads attempt to acquire the spinlock can be: thread 3, thread 4, thread 5, and thread 6, where threads can acquire the spinlock based on their relative positions in the FIFO ordering. The 3 waiting threads (e.g., threads 4-6) can wait to acquire the spinlock on a queue where each waiting thread has a position on the queue based on the thread's position in the FIFO ordering. In this example, thread 4 is the next waiting spinning thread inline in the FIFO ordering for acquiring the spinlock. Thread 5 is further the next consecutive waiting spinning thread in the FIFO ordering following thread 4. Thread 6 is the next consecutive waiting spinning thread in the FIFO ordering following thread 6. Thus, based on the FIFO ordering, the following denotes the sequential consecutive order in which waiting threads are expected to acquire the spinlock: thread 4, thread 5 and then thread 6. For illustration purposes, assume that: thread 3 has position or index 3 in the FIFO ordering; thread 4 has position or index 4 in the FIFO ordering; thread 5 has position or index 5 in the FIFO ordering; and thread 6 has position or index 6 in the FIFO ordering. In this example, each thread can be expected to acquire the spinlock based on the consecutive increasing integer ordering of the positions or indexes denoting the FIFO ordering.

606

While thread 3 holds the spinlock, thread 4 is pre-empted such as by an operating system scheduler. As a result, thread 4's execution state transitions from active (e.g., executing or spinning while waiting) to inactive (e.g., not executing). Thus pre-empted thread 4 is inactive or not executing while waiting to acquire the spinlock at its corresponding position 4 in the FIFO ordering.

608

While thread 4 is waiting and inactive, thread 3 releases the spinlock such that the spinlock can now be acquired by another thread. Based on the FIFO ordering, thread 4 is the next thread that can acquire the spinlock. However, thread 4 is inactive and therefore currently unable to execute code of SpinLock_Acquire to acquire the free spinlock. While waiting thread 4 is inactive and while the spinlock is free, thread 5 can be executing and spinning in the SpinLock_Acquire routine waiting to acquire the spinlock.

At this point, thread 4 can be characterized as a blocking or blocker thread that is blocking or preventing thread 5, the next executing waiting thread in the FIFO ordering following blocking thread 4, from acquiring the free spinlock.

In at least one embodiment, the state ST2 of thread 3 releasing the spinlock can be denoted by i) now_serving =4 (e.g., where , and ii) Lock_Taken = 0 or false. In at least one embodiment, thread 3 can execute code of SpinLock_Release that transitions from the state ST1 to ST2 by incrementing now_serving from 3 to 4, and updating Lock_Taken from 1 to 0.

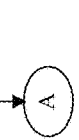

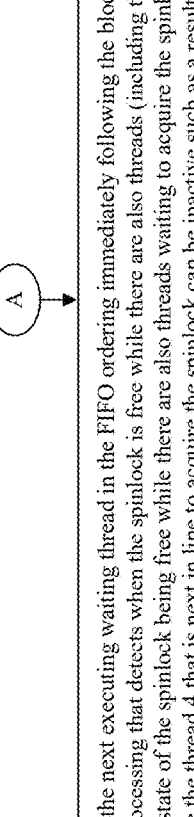

610

Thread 5 (e.g., the next executing waiting thread in the FIFO ordering immediately following the blocking pre-empted thread 4), can perform processing that detects when the spinlock is free while there are also threads (including thread 5) waiting to acquire the spinlock. The foregoing state of the spinlock being free while there are also threads waiting to acquire the spinlock can denote a signature of the second scenario, where the thread 4 that is next in line to acquire the spinlock can be inactive such as a result of having been pre-empted such that pre-empted thread 4 is blocking other waiting threads, such as thread 5, from acquiring the spinlock.

In at least one embodiment, thread 5 can detect the occurrence of the foregoing signature by detecting that i) the spinlock is free and also ii) thread 5 remains waiting (e.g., waiting in its current position or index 5 in the FIFO ordering) such as for some specified threshold amount of time or for a specified number of repeated checks.

In at least one embodiment, thread 5 can detect the occurrence of the foregoing signature of the second scenario of the blocking pre-empted thread 4 by determining the persistence of the following two conditions for some specified amount of time or number of repeated checks: i) Lock_Taken is equal to 0, and ii) now_serving+1 is equal to 5, denoting the index or position in the FIFO ordering assigned to thread 5, the next consecutive index or position in the FIFO ordering following the index or position 4 of the pre-empted blocking thread 4.

In at least one embodiment, thread 5 can detect the occurrence of the foregoing signature as part of processing performed in the SpinLock_Acquire routine. In response, thread 5 can further perform processing in the SpinLock_Acquire routine: i) that cancels thread 4's position in the FIFO ordering or queue (e.g., remove thread 4 from its current position 4 in the FIFO ordering or queue); ii) that stores or saves thread 4's canceled position or FIFO ordering index (e.g., saves thread 4's index=4); and iii) that results in thread 5 acquiring the spinlock (e.g., such that thread 5 completes its current execution of the SpinLock_Acquire routine and returns from the SpinLock_Acquire routine).

The state ST3 of thread 5 acquiring or holding the spinlock can be denoted by i) now_serving =5, and ii) Lock_Taken = 1 or true, where now_serving and Lock_Taken can be accordingly updated in SpinLock_Acquire as executed by thread 5 prior to returning from SpinLock_Acquire. In at least one embodiment, thread 5 can execute code of SpinLock_Acquire that transitions from the state ST2 to the state ST3 by incrementing now_serving from 4 to 5 and setting Lock_Taken to 1.

612

Pre-empted thread 4 can subsequently be rescheduled for execution and can thus resume execution of the SpinLock_Acquire routine (e.g., such as from the point where thread 4 was previously pre-empted or interrupted). Thread 4 can determine that its prior position 4 in the FIFO ordering was canceled, such as by determining its assigned position or index 4 is equal to the saved or canceled position or index 4. Responsive to determining its position in the FIFO ordering was canceled, thread 4 can repeat processing or restart processing to acquire the spinlock. In at least one embodiment, thread 4 can transfer control to the beginning or start of SpinLock_Acquire such as at Restart 402 such that thread 4 obtains a new next position or index in the FIFO ordering. For example, assuming the tail or last position or index in the FIFO ordering is 6, thread 4 can be assigned position or index 7 in the FIFO ordering following thread 6 (assigned index 6).

FIG. 7B

FAIR SPINLOCK WITH PROTECTION AGAINST THREAD PREEMPTION

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: a first thread TH1 acquiring a spinlock; while TH1 holds the spinlock, a second thread TH2 and a third thread TH3 each attempting to acquire the spinlock; responsive to TH2 and TH3 attempting to acquire the spinlock while held by TH1, adding TH2 and TH3 to a queue of threads waiting to acquire the spinlock, wherein TH2 and TH3 are added to the queue based on a FIFO (first in first out) ordering in which threads attempt to acquire the spinlock, where TH1 has a first position or index P1 in the FIFO ordering, TH2 has a second position or index P2 in the FIFO ordering consecutively following TH1, and TH3 has a third position or index P3 in the FIFO ordering consecutively following TH2; while TH1 holds the spinlock, preempting TH2 so that TH2 becomes inactive; while TH2 is inactive and waiting at the second position or index P2 in the FIFO ordering of the queue, TH1 releasing the spinlock so that the spinlock is free; detecting that the spinlock is free and that TH3 is waiting in the queue at the third position or index P3 immediately following the second position or index P2 of TH2, where TH2 is next, in the FIFO ordering of threads in the queue, to acquire the spinlock after released by TH1; and responsive to said detecting, determining that TH2 is inactive and has been pre-empted, and performing first processing including: cancelling the second position or index P2 of TH2 in the FIFO ordering; and TH3 acquiring the spinlock.

In at least one embodiment, the first processing can include saving a copy of the second position or index P2 in saved information. Processing can include: subsequent to said canceling, rescheduling TH2 for execution; and responsive to said rescheduling, TH2 resuming execution. TH2 resuming execution can include TH2 performing second processing including: determining, using the copy of the second position or index P2, that the second position or index P2 of TH2 in the FIFO ordering is canceled; and responsive to determining that the second position or index P2 of TH2 in the FIFO ordering is canceled, assigning TH2 a fourth position or index P4 in the FIFO ordering, wherein P4 has a corresponding position or index in the FIFO ordering subsequent to the third position or index P3. P4 can denote a position or index in the FIFO ordering at a tail or end of the FIFO ordering such that all threads having corresponding indices less than P4 occur in the FIFO ordering prior to TH2 such that all threads having corresponding indices less than P4 are expected to acquire the spinlock prior to TH2.

In at least one embodiment, the detecting can be performed by TH3 having the second position or index P2 immediately following the first position or index P1 of TH2. Detecting can include repeatedly checking a specified number of times that i) the spinlock is free or not taken, and ii) TH3 is waiting in the queue at the third position or index P3 immediately following the second position or index P2 of TH2. The FIFO ordering can be a sequence of consecutive integers such that threads attempting to acquire the spinlock are each assigned a next consecutive integer in the sequence in accordance with an order in which the threads attempt to acquire the spinlock. While TH1 holds the spinlock, a first variable, now_serving, can be equal to the first position or index P1 of TH1, and a second variable, lock_taken, can be 1 or true to denote the spinlock is taken or held by a corresponding thread TH1 having the first position or index P1 as indicated by now_serving.

In at least one embodiment, TH1 releasing the spinlock can include: incrementing now_serving from P1 to P2 denoting that TH2, having the second position or index P2, is a next thread following TH1 allowed to acquire the spinlock in accordance with the FIFO ordering; and updating lock_taken to 0 or false to denote that the spinlock is free and not taken thereby denoting that the spinlock is available for acquisition by a next thread. Detecting can include: determining whether lock_taken is 0; and determining whether a first quantity, now_serving+1, is equal to the third position or index P3 of TH3. TH3 acquiring the spinlock can include: incrementing now_serving from P2 to P3 denoting that TH3, having the third position or index P3, is a next thread allowed to acquire the spinlock in accordance with the FIFO ordering; and updating lock_taken to 1 or true to denote that the spinlock taken or held by a corresponding thread TH3 having the third position or index P3 as indicated by now_serving.

In at least one embodiment, processing can include subsequent to TH1 acquiring the spinlock, TH1 executing a first critical code section that includes updating one or more data items that are only allowed to be updated by a single thread at a time. Each of TH1, TH2 and TH3 can include a corresponding critical code section the updates the one or more data items whose access is serially synchronized using the spinlock such that a corresponding thread is required to acquire and hold the spinlock in order to provide the corresponding thread with exclusive access to the one or more data items accessed in the corresponding critical code section. Subsequent to TH1 completing execution of the first critical code section, TH1 can release the spinlock so that the spinlock is free. TH1 and TH2 can be added to the queue, in said adding, at a first point in time where TH1 and TH2 are waiting in the queue each executing code in a busy wait loop.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 3A is an example of pseudocode describing a ticketing spinlock implementation in at least one embodiment.

FIGS. 4, 5A, 5B and 6 are examples of pseudocode describing a ticketing spinlock implementation in at least one embodiment in accordance with the techniques of the present disclosure.

FIGS. 7A and 7B are flowcharts of processing steps that can be performed in at least one embodiment in accordance with the techniques of the present disclosure.

DETAILED DESCRIPTION OF EMBODIMENT(S)

Figure 1:
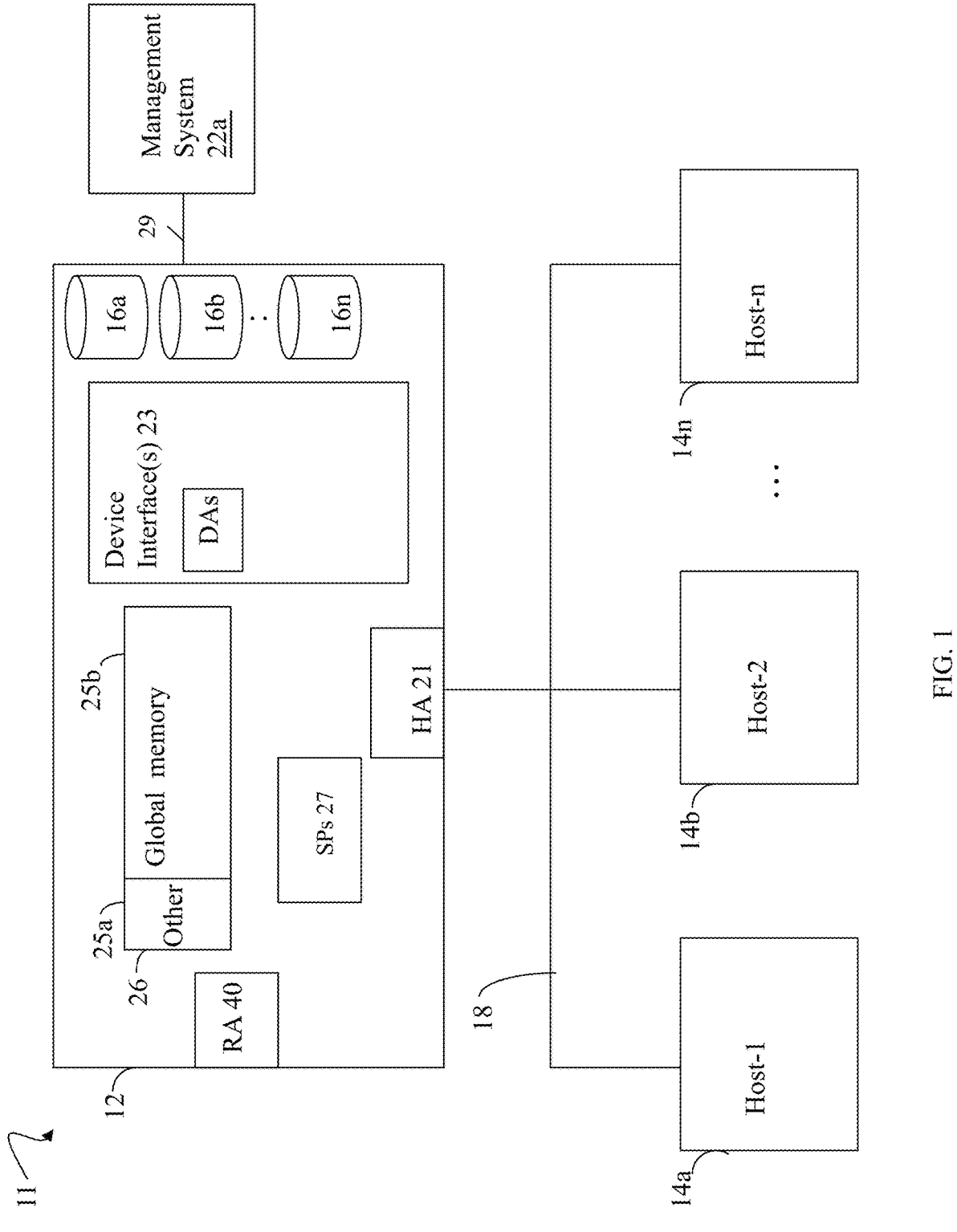
FIG. 1 is an example of components that can be included in a system in accordance with the techniques of the present disclosure.

Different techniques, methods or primitives can be used to manage concurrent access to a critical section of code. A critical section or critical region of code is one in which entry into the critical section or region is controlled so that only one task or thread at a time is allowed to execute code of the critical section or region. Generally, the critical section or region of code can be any suitable code section or instructions where exclusive access or exclusive execution of such instructions of the critical section is needed. As a simple non-limiting example, a critical section of code can update or modify a global variable or other shared data, where the global variable or other shared data is allowed to be updated by multiple different threads or tasks. As such, the code to update the global variable or other shared data can be included in a critical section that uses a suitable technique, method or primitive such that only a single thread at a time is allowed to execute code of the critical section to update the global variable or other shared data.

A lock is one method or primitive that can be used to manage concurrent access to a critical section of code so that only a single thread at a time is allowed to enter the critical section. Each of the multiple threads that need to execute code of the critical section can acquire the lock prior to executing or entering the critical section. Once the thread holding or acquiring the lock is done executing code of the critical section, the lock holding thread can free or release the lock thereby making it available for acquisition by another thread.

In particular a spinlock is one method or primitive that can be used to manage concurrent access to a critical section of code. A spinlock is a lock that causes a thread trying to acquire the lock to simply wait in a loop ("spin") while repeatedly executing and checking whether the lock is available, where the thread exists the loop or wait loop once the desired lock becomes available/is free. Since the spinning thread remains active but is not performing a useful task, the spinlock can be characterized as one where a waiting spinning thread is performing a busy waiting in the wait loop. Spinlocks are usually applied, for example, to protect very short critical sections of code so that the time of holding the lock is very short, thus providing a good trade-off between time required to acquire the lock and potential wasting of CPU cycles for long spinning.

A spinlock can be contrasted with a non-spinning lock where, for example, a thread waiting to acquire a non-spinning lock can i) release the CPU such that the thread is not executing while waiting, ii) wait in a wait queue (while the thread is not executing and thus not consuming CPU execution cycles), and iii) be removed from the wait queue to resume execution to acquire the lock once the lock is released by another thread that is the current lock holder. Switching executing threads such as in connection with stopping and resuming execution of a waiting thread using a non-spinning lock can result in performing expensive CPU-intensive processing such as context switching as threads are switched in and out of execution. Thus a spinlock can be useful when a lock on a shared resource is not going to be held for very long. In such cases it can be efficient for the waiting thread to spin or execute performing busy waiting for a few cycles until the lock is released. By having a waiting thread spin (e.g., rather than use a non-spinning lock) while waiting to acquire the lock, the waiting thread avoids performing the more expensive CPU-intensive processing (e.g., such as context switching) typically associated with non-spinning locks. Because spinlocks can avoid CPU-intensive processing overhead from operating system process rescheduling or context switching, spinlocks are efficient if threads are likely to spin or wait for only short periods. However, spinlocks can be wasteful if a spinlock is held by a thread for a long period of time since waiting threads that spin (e.g., execute) prevent other threads from running and can require rescheduling. For example with spinlocks, the longer a thread holds a spinlock, the greater the risk the thread will be interrupted or pre-empted by the operating system scheduler while holding the spinlock. If the foregoing occurs where the lock holding thread is interrupted, other threads currently spinning and waiting to acquire the same lock will remain spinning repeatedly trying to acquire the lock of the interrupted lock holder thread.

The simplest spinlock can provide for a thread spinning in a busy wait loop continually checking to see if the desired spinlock is free, where the thread breaks out of the busy wait loop to acquire the spinlock once freed or released. The foregoing simplest spinlock can provide for random lock acquisition among the busy waiting threads without implementing any mechanism of fairness or predictability in connection with lock acquisition and can thus lead to thread starvation. Put another way, the foregoing simplest spinlock does not provide fairness such as in a multiple CPU environment and can result in starvation for a spinning waiting thread where the waiting thread is not guaranteed to acquire the spinlock and/or may acquire the spinlock only after an unpredictable long amount of time.

To avoid the unfairness and potential starvation that can result in connection with a simple spinlock as noted above, a fair lock technique can be utilized. For example, a fair spinlock can be utilized that provides a predictable FIFO (first in first out) ordering for lock granting to waiting threads. One implementation of the fair spinlock uses a ticketing spinlock. For a ticketing spinlock, two integer values, queue ticket and dequeue ticket, can be used and initialized to zero. The queue ticket can denote the thread's position in the FIFO ordering or queue; and the dequeue ticket is the ticket, or FIFO ordering or queue position, that holds the lock. When a thread arrives, it atomically obtains and then increments the queue ticket number. The atomicity of this operation is required to prevent two threads from simultaneously being able to obtain the same ticket number. The thread then compares its ticket value or number, before the increment, with the dequeue ticket's value or number, denoting the ticket number to be served next by being allowed to enter the critical section and acquire the lock. If the dequeue ticket value is the same as the thread's ticket value, the thread is permitted to enter the critical section. Otherwise if the dequeue ticket value is not the same as the thread's ticket value, then another thread must already be in the critical section and this thread must busy-wait. When a thread leaves the critical section controlled by the spinlock, the thread atomically increments the dequeue ticket value or number. This allows the next waiting thread, the one with the next sequential ticket number, to acquire the spinlock and enter the critical section associated with the spinlock. Thus queue-based spinlocks, such as the ticketing spinlock, can provide a FIFO queue-based ordering where waiting spinning threads can acquire the spinlock in the order attempted.

The ticketing spinlock, and generally a fair spinlock implementation, can work well in high contention scenarios and can guarantee fair lock acquisition in a predictable amount of time such as when a single high performance application is the only owner of CPU cores. However in scenarios where CPU cores can be shared between multiple such applications or where there are many interrupts in the system, the fair spinlock can also cause thread starvation under certain conditions. For example, consider two scenarios using a FIFO queue-based spinlock where an interrupt such as by an operating system scheduler causes preemption of an executing thread where such preemption can result in starvation or otherwise result in wasting an undesirable amount of CPU time/cycles.

As a first scenario, a thread holding the spinlock can be pre-empted such as by the operating system scheduler initiating a context switch. For example, the executing thread holding the spinlock can be pre-empted or interrupted by the scheduler to execute a different scheduled second thread. In this case, all other threads that are spinning and waiting to acquire the same spinlock as held by the pre-empted thread will continue to wait and spin until the pre-empted thread holding the spinlock is scheduled again for execution and can release the spinlock. The foregoing first scenario can generally occur with any type of fair spinlock implementation and can generally have a low probability of occurring since the critical section of code tends to be small in terms of the number of instructions. Generally a critical code section can be written with as few instructions as possible to minimize the amount of time any waiting thread waits to acquire the spinlock.

As a second scenario, the pre-empted thread may not be a first thread currently holding the spinlock but can rather be a second thread that is the next successive waiting thread in the FIFO ordering or queue of waiting (spinning) threads such that the second thread is the next consecutive waiting thread in line to acquire the spinlock when the first thread (the current lock holder) releases the spinlock. In this second scenario, when the first thread or current lock owner releases the spinlock, none of the waiting threads will be able to acquire the spinlock since the second thread, the next thread in line in the FIFO ordering waiting to acquire the spinlock, has been pre-empted (e.g., is not executing/is inactive). As a result, all waiting or spinning threads waiting to acquire the same spinlock as the pre-empted second thread will continue to spin and wait despite the spinlock being free (e.g., other waiting threads in the FIFO queue subsequent to the pre-empted second thread will continue to spin and wait). To further illustrate, consider the following example where thread 3 is currently holding the spinlock. The spinlock can have an associated FIFO queue of other spinning threads waiting to acquire the spinlock. Based on the FIFO ordering of the queue, the queue can include, in FIFO order, thread 4, thread 5 and thread 6, such that thread 4 is the next waiting thread that will acquire the spinlock once released by thread 3. Thread 4 can be spinning and then pre-empted while waiting in the FIFO queue while thread 3 holds the spinlock. Subsequently, thread 3 can release the spinlock. However, thread 4 cannot now acquire the free spinlock since thread 4 is no longer executing due to thread 4's pre-emption. Additionally, waiting threads 5 and 6 cannot acquire the spinlock even though the spinlock is free. Threads 5 and 6 can be prevented from acquiring the spinlock until after the thread 4 has been rescheduled for execution and then acquires and releases the spinlock. However, thread 4 has been pre-empted or interrupted by the scheduler while waiting to acquire the spinlock. As a result of preempting waiting spinning thread 4, the other waiting threads 5 and 6 are also left spinning and waiting (repeatedly trying to acquire the spinlock) even though the spinlock is now free after being released by thread 3. Subsequently, the preempted thread 4 can be scheduled again for execution where the thread 4 acquires the spinlock, executes code of the corresponding critical section, and then releases the spinlock. Only after thread 4 releases the spinlock can the next waiting thread 5 acquire the spinlock.

The probability of occurrence of this second scenario can generally be much higher than the occurrence of the first scenario. Also using spinlocks in highly contentious systems with many CPU cores, the amount of time spent spinning and waiting for a spinlock can undesirably be much higher than the amount of time spent holding the lock. Additionally, the second scenario can result in an avalanche effect resulting in repeating the second scenario multiple times. For example, with the second scenario, all waiting threads can be spinning for a long period of time before the pre-empted thread noted above is scheduled for execution again. The initial occurrence of the second scenario can increase the probability that some other spinning waiting thread will also be preempted by the scheduler and become the next bottleneck.

The foregoing second scenario can generally be characterized as more problematic and more likely to occur than the foregoing first scenario. Simple unfair spinlocks such as noted above do not result in the second scenario that can occur with fair spinlocks. However, using a simple unfair spinlock is generally not acceptable in highly contentious systems since starvation can also occur.

To overcome at least the foregoing drawbacks of the fair spinlock such as with the above-noted second scenario, the techniques of the present disclosure can be utilized.

In at least one embodiment, the techniques of the present disclosure use a fair spinlock that is a FIFO queue-based spinlock. In at least one embodiment, the techniques of the present disclosure use a fair spinlock that is a ticketing spinlock to provide protection against thread pre-emption such as in the second scenario above, where the pre-empted thread can be the next waiting spinning thread that will acquire the spinlock.

In at least one embodiment, the techniques of the present disclosure provide for detecting the occurrence of the second scenario such as noted above where the next waiting thread in the spinlock FIFO queue is pre-empted and the current lock holder releases the spinlock. For example in at least one embodiment where the FIFO queue includes, in FIFO order, the spinning waiting threads 4, 5 and 6 as noted above, the next waiting thread is thread 4, and the techniques of the present disclosure provide for determining when waiting thread 4 has been pre-empted and when another thread 3, the current spinlock holder, releases the spinlock while pre-empted thread 4 is inactive or not executing. In at least one embodiment, the foregoing second scenario can be detected by the waiting thread 5 immediately following the pre-empted inactive thread 4 in the FIFO queue ordering. In at least one embodiment, responsive to detecting the second scenario instance, the next waiting thread 5 of the FIFO queue can also perform processing to acquire the spinlock and thus prevent the previously pre-empted thread 4 from immediately acquiring the spinlock once thread 4 is rescheduled for execution. In at least one embodiment, thread 5 can also save information indicating that thread 4's position in the FIFO queue waiting to acquire the spinlock was effectively cancelled by thread 5's spinlock acquisition. The saved information can be used by the pre-empted thread 4 when it resumes execution (e.g., when next scheduled) such that i) thread 4 recognizes its FIFO queue waiting position has been cancelled, and ii) thread 4 can then subsequently perform processing to once again attempt to acquire the spinlock. In at least one embodiment, thread 4 can generally repeat or restart processing to acquire the spinlock including waiting in the FIFO queue at a next position in the FIFO ordering if the spinlock is not free. Thus in at least one embodiment, the rescheduled previously pre-empted thread 4 can obtain a new position or index in the FIFO queue at the tail end of the queue based on the FIFO ordering. In at least one embodiment, waiting threads can be removed from the head of the FIFO queue based on the FIFO ordering or position in the queue.

In at least one embodiment, the threads in the FIFO queue waiting to acquire the spinlock can have corresponding FIFO queue positions or indices denoted by corresponding consecutive sequentially increasing integers such as 1, 2, 3, and so on, where waiting threads can acquire the spinlock in consecutive increasing sequential order of their corresponding queue positions or indices. Waiting threads can be placed in the FIFO queue of the spinlock based on the order in which the waiting threads attempt to acquire the spinlock. Waiting threads can generally acquire the spinlock based on their FIFO ordering or position in the FIFO queue. A queue position with a lower index can occur in the FIFO ordering before other positions having a higher index. For example a FIFO queue position or index 1 can denote the first position in the queue of the next waiting thread to acquire the spinlock; index 2 can denote the next consecutive position in the queue following index 1; and so on, so that generally index N+1 denotes the next consecutive position in the queue following index N, where waiting threads can exclusively acquire the spinlock in consecutive sequential order based on the increasing positions or indices in the queue. To further illustrate based on the above, the FIFO queue for the spinlock can include in FIFO order: thread 4 at queue position 1 with an index=1; thread 5 at queue position 2 with an index=2; and thread 6 at queue position 3 with an index=3. In at least one embodiment, the last queue position, such as position or index 3 in the foregoing example, can denote the tail of the queue such that new waiting threads waiting for the spinlock can be added in FIFO order beginning with queue position 4 with an index=4. Queue position 1 in at least one embodiment can denote the head of the queue from which threads are removed. Queue position 3 in the foregoing example can denote the tail or end of the queue where subsequent waiting threads can be added in corresponding subsequent queue entries or positions.

In at least one embodiment for a spinlock with a FIFO queue of spinning waiting threads, the techniques of the present disclosure provide for detecting the occurrence of the above-noted second scenario where i) the spinlock is free and ii) a first waiting thread with the corresponding FIFO queue position or index=1 at the current head of the FIFO ordering has been pre-empted and is inactive, where index 1 can denote the FIFO ordering of the next waiting thread that that can acquire the spinlock. In at least one embodiment, the techniques of the present disclosure provide for a second waiting thread with the corresponding FIFO queue position or index=2 (e.g., the next subsequent second waiting thread in the FIFO ordering following the pre-empted first waiting thread) determining when the first waiting thread at index 1 has been pre-empted and is inactive or not executing and when the spinlock is also free. In at least one embodiment, responsive to the second thread at queue index 2 determining that i) the spinlock is free and ii) the first thread at queue index 1 (e.g., head of the FIFO ordering) has been pre-empted and is inactive or not executing, the techniques of the present disclosure provide for i) the second waiting thread acquiring the spinlock ahead of the pre-empted first waiting thread and ii) the second waiting thread recording information denoting that the pre-empted first thread's position in the queue has been cancelled. Subsequently when the pre-empted first thread is again scheduled for execution, the first thread can use the saved information to recognize that its position in the FIFO ordering or queue was cancelled and then restart acquiring the spinlock. In at least one embodiment if the spinlock is not free when the first thread restarts processing to acquire the spinlock, the first thread performing processing to restart acquiring the spinlock can spin and wait in the FIFO queue at a corresponding index or position at the tail end of the queue.

In at least one embodiment, ticket numbers can be used to denote an order in which threads request or attempt to acquire the spinlock. In at least one embodiment, the ticket numbers used with the spinlock can be an integer sequence of consecutive integers such as beginning with 0. In at least one embodiment, the ticket numbers used with a spinlock can be a monotonically increasing sequence of consecutive integers. In at least one embodiment, the above-noted second waiting thread at FIFO queue position or index 2 can save the first thread's ticket number in the saved information denoting that the pre-empted first thread's position in the queue has been cancelled. Thus the first thread's ticket number can denote a cancelled ticket of the saved information. When the pre-empted first thread is rescheduled for execution, the first thread can compare its ticket number to the cancelled ticket number of the saved information. If the first thread's ticket number matches the cancelled ticket number, the first thread can i) recognize that its ticket number and thus queue position was previously cancelled and ii) restart processing to acquire the spinlock.

The foregoing and other aspects of the techniques of the present disclosure are described in more detail in the following paragraphs.

Referring to the FIG. 1, shown is an example of an embodiment of a system 11 that can be used in connection with performing the techniques described herein. The system 11 includes a data storage system 12 connected to the host systems (also sometimes referred to as hosts) 14a-14n through the communication medium 18. In this embodiment of the system 11, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 11.

Each of the host systems 14a-14n and the data storage system 12 included in the system 11 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 11 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems $14a$-$14n$ provide data and access control information through channels to the storage systems 12, and the storage systems 12 also provide data to the host systems $14a$-$n$ through the channels. The host systems $14a$-$n$ do not address the drives or devices $16a$-$16n$ of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system $22a$ that can be used to manage and monitor the data storage system 12. In one embodiment, the management system $22a$ can be a computer system which includes data storage system management software or application that executes in a web browser. A data storage system manager can, for example, view information about a current data storage configuration such as LUNs, storage pools, and the like, on a user interface (UI) in a display device of the management system $22a$. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive $16a$-$16n$. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

In at least one embodiment, reading contents stored at a logical address LA1 such as to service a read I/O in response to a read cache miss can including traversing the mapping information of the chain of metadata pages mapping the logical address to a physical location or address of the content of LA1 as stored in BE non-volatile storage.

In at least one embodiment, a write I/O that writes content C1 to LA1 can be persistently recorded, such as in a log discussed elsewhere herein, and then an acknowledgement can be returned to the issuing client. Subsequently, the recorded write I/O can be flushed from the log. Flushing the recorded write I/O can include storing C1 at a physical location or address, and then creating and/or updating corresponding mapping information that maps LA1 the physical location of C1.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
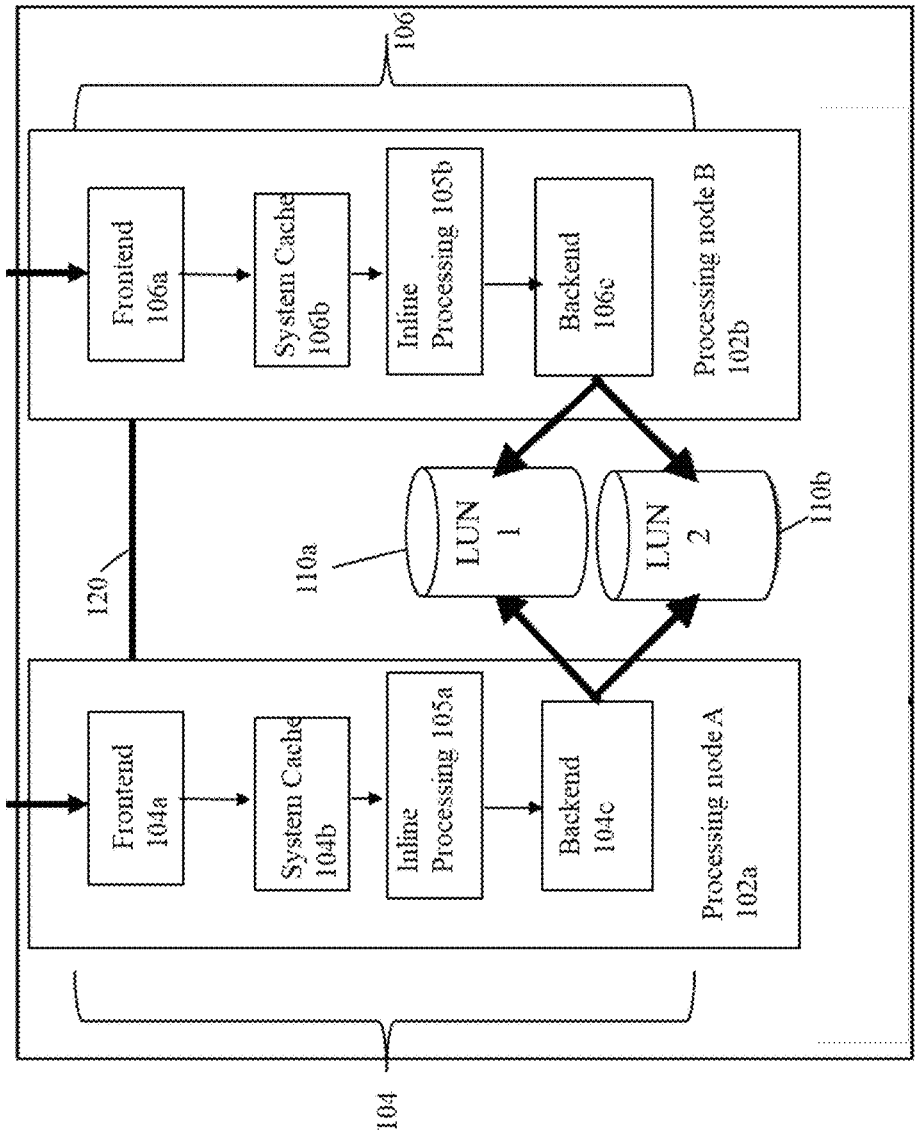
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106*a*, system cache layer 106*b*, inline processing layer 105*b*, and BE component 106*c* that are respectively similar to the components 104*a*, 104*b*, 105*a* and 104*c*. The elements 110*a*, 110*b* denote the non-volatile BE physical storage provisioned from PDs for the LUNs, whereby an I/O can be directed to a location or logical address of a LUN and where data can be read from, or written to, the logical address. The LUNs 110*a*, 110*b* are examples of storage objects representing logical storage entities included in an existing data storage system configuration. Since, in this example, writes directed to the LUNs 110*a*, 110*b* can be received for processing by either of the nodes 102*a* and 102*b*, the example 100 illustrates what is also referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110*a*, 110*b* by the BE component 104*c*. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2 is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be described and represented as the nodes 102*a*-*b* in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Different techniques, methods or primitives can be used to manage concurrent access to a critical section of code. A critical section or critical region of code is one in which entry into the critical section or region is controlled so that only one task or thread at a time is allowed to execute code of the critical section or region. Generally, the critical section or region of code can be any suitable code section or instructions where exclusive access or exclusive execution of such instructions of the critical section is needed. As a simple non-limiting example, a critical section of code can update or modify a global variable or other shared data, where the global variable or other shared data is allowed to be updated by multiple different threads or tasks. As such, the code to update the global variable or other shared data can be included in a critical section that uses a suitable technique, method or primitive such that only a single thread at a time is allowed to execute code of the critical section to update the global variable or other shared data.

A lock is one method or primitive that can be used to manage concurrent access to a critical section of code so that only a single thread at a time is allowed to enter the critical section. Each of the multiple threads that need to execute code of the critical section can acquire the lock prior to executing or entering the critical section. Once the thread holding or acquiring the lock is done executing code of the critical section, the lock holding thread can free or release the lock thereby making it available for acquisition by another thread.

In particular a spinlock is one method or primitive that can be used to manage concurrent access to a critical section of code. A spinlock is a lock that causes a thread trying to acquire the lock to simply wait in a loop ("spin") while repeatedly executing and checking whether the lock is available, where the thread exists the loop or wait loop once the desired lock becomes available/is free. Since the spinning thread remains active but is not performing a useful task, the spinlock can be characterized as one where a waiting spinning thread is performing a busy waiting in the wait loop. Spinlocks are usually applied, for example, to protect very short critical sections of code so that the time of holding the lock is very short, thus providing a good trade-off between time required to acquire the lock and potential wasting of CPU cycles for long spinning.

A spinlock can be contrasted with a non-spinning lock where, for example, a thread waiting to acquire a non-spinning lock can i) release the CPU such that the thread is not executing while waiting, ii) wait in a wait queue (while the thread is not executing and thus not consuming CPU execution cycles), and iii) be removed from the wait queue to resume execution to acquire the lock once the lock is released by another thread that is the current lock holder. Switching executing threads such as in connection with stopping and resuming execution of a waiting thread using a non-spinning lock can result in performing expensive CPU-intensive processing such as context switching as threads are switched in and out of execution. Thus a spinlock can be useful when a lock on a shared resource is not going to be held for very long. In such cases it can be efficient for the waiting thread to spin or execute performing busy waiting for a few cycles until the lock is released. By having a waiting thread spin (e.g., rather than use a non-spinning lock) while waiting to acquire the lock, the waiting thread avoids performing the more expensive CPU-intensive processing (e.g., such as context switching) typically associated with non-spinning locks. Because spinlocks can avoid CPU-intensive processing overhead from operating system process rescheduling or context switching, spinlocks are efficient if threads are likely to spin or wait for only short periods. However, spinlocks can be wasteful if a spinlock is held by a thread for a long period of time since waiting threads that spin (e.g., execute) prevent other threads from running and can require rescheduling. For example with spinlocks, the longer a thread holds a spinlock, the greater the risk the thread will be interrupted or pre-empted by the operating system scheduler while holding the spinlock. If the foregoing occurs where the lock holding thread is interrupted, other threads currently spinning and waiting to acquire the same lock will remain spinning repeatedly trying to acquire the lock of the interrupted lock holder thread.

The simplest spinlock can provide for a thread spinning in a busy wait loop continually checking to see if the desired spinlock is free, where the thread breaks out of the busy wait loop to acquire the spinlock once freed or released. The foregoing simplest spinlock can provide for random lock acquisition among the busy waiting threads without implementing any mechanism of fairness or predictability in connection with lock acquisition and can thus lead to thread starvation. Put another way, the foregoing simplest spinlock does not provide fairness such as in a multiple CPU environment and can result in starvation for a spinning waiting thread where the waiting thread is not guaranteed to acquire the spinlock and/or may acquire the spinlock only after an unpredictable long amount of time.

To avoid the unfairness and potential starvation that can result in connection with a simple spinlock as noted above, a fair lock technique can be utilized. For example, a fair spinlock can be utilized that provides a predictable FIFO (first in first out) ordering for lock granting to waiting threads. One implementation of the fair spinlock uses a ticketing spinlock. For a ticketing spinlock, two integer values, queue ticket and dequeue ticket, can be used and initialized to zero. The queue ticket can denote the thread's position in the FIFO ordering or queue; and the dequeue ticket is the ticket, or FIFO ordering or queue position, that holds the lock. When a thread arrives, it atomically obtains and then increments the queue ticket number. The atomicity of this operation is required to prevent two threads from simultaneously being able to obtain the same ticket number. The thread then compares its ticket value or number, before the increment, with the dequeue ticket's value or number, denoting the ticket number to be served next by being allowed to enter the critical section and acquire the lock. If the dequeue ticket value is the same as the thread's ticket value, the thread is permitted to enter the critical section. Otherwise if the dequeue ticket value is not the same as the thread's ticket value, then another thread must already be in the critical section and this thread must busy-wait. When a thread leaves the critical section controlled by the spinlock, the thread atomically increments the dequeue ticket value or number. This allows the next waiting thread, the one with the next sequential ticket number, to acquire the spinlock and enter the critical section associated with the spinlock. Thus queue-based spinlocks, such as the ticketing spinlock, can provide a FIFO queue-based ordering where waiting spinning threads can acquire the spinlock in the order attempted.

The ticketing spinlock, and generally a fair spinlock implementation, can work well in high contention scenarios and can guarantee fair lock acquisition in a predictable amount of time such as when a single high performance application is the only owner of CPU cores. However in scenarios where CPU cores can be shared between multiple such applications or where there are many interrupts in the system, the fair spinlock can also cause thread starvation under certain conditions. For example, consider two scenarios using a FIFO queue-based spinlock where an interrupt such as by an operating system scheduler causes preemption of an executing thread where such preemption can result in starvation or otherwise result in wasting an undesirable amount of CPU time/cycles.

As a first scenario, a thread holding the spinlock can be pre-empted such as by the operating system scheduler initiating a context switch. For example, the executing thread holding the spinlock can be pre-empted or interrupted by the scheduler to execute a different scheduled second thread. In this case, all other threads that are spinning and waiting to acquire the same spinlock as held by the pre-empted thread will continue to wait and spin until the pre-empted thread holding the spinlock is scheduled again for execution and can release the spinlock. The foregoing first scenario can generally occur with any type of fair spinlock implementation and can generally have a low probability of occurring since the critical section of code tends to be small in terms of the number of instructions. Generally a critical code section can be written with as few instructions as possible to minimize the amount of time any waiting thread waits to acquire the spinlock.

As a second scenario, the pre-empted thread may not be a first thread currently holding the spinlock but can rather be a second thread that is the next successive waiting thread in the FIFO ordering or queue of waiting (spinning) threads such that the second thread is the next consecutive waiting thread in line to acquire the spinlock when the first thread (the current lock holder) releases the spinlock. In this second scenario, when the first thread or current lock owner releases the spinlock, none of the waiting threads will be able to acquire the spinlock since the second thread, the next thread in line in the FIFO ordering waiting to acquire the spinlock, has been pre-empted (e.g., is not executing/is inactive). As a result, all waiting or spinning threads waiting to acquire the same spinlock as the pre-empted second thread will continue to spin and wait despite the spinlock being free (e.g., other waiting threads in the FIFO queue subsequent to the pre-empted second thread will continue to spin and wait). To further illustrate, consider the following example where thread 3 is currently holding the spinlock. The spinlock can have an associated FIFO queue of other spinning threads waiting to acquire the spinlock. Based on the FIFO ordering of the queue, the queue can include, in FIFO order, thread 4, thread 5 and thread 6, such that thread 4 is the next waiting thread that will acquire the spinlock once released by thread 3. Thread 4 can be spinning and then pre-empted while waiting in the FIFO queue while thread 3 holds the spinlock. Subsequently, thread 3 can release the spinlock. However, thread 4 cannot now acquire the free spinlock since thread 4 is no longer executing due to thread 4's pre-emption. Additionally, waiting threads 5 and 6 cannot acquire the spinlock even though the spinlock is free. Threads 5 and 6 can be prevented from acquiring the spinlock until after the thread 4 has been rescheduled for execution and then acquires and releases the spinlock. However, thread 4 has been pre-empted or interrupted by the scheduler while waiting to acquire the spinlock. As a result of preempting waiting spinning thread 4, the other waiting threads 5 and 6 are also left spinning and waiting (repeatedly trying to acquire the spinlock) even though the spinlock is now free after being released by thread 3. Subsequently, the preempted thread 4 can be scheduled again for execution where the thread 4 acquires the spinlock, executes code of the corresponding critical section, and then releases the spinlock. Only after thread 4 releases the spinlock can the next waiting thread 5 acquire the spinlock.

The probability of occurrence of this second scenario can generally be much higher than the occurrence of the first scenario. Also using spinlocks in highly contentious systems with many CPU cores, the amount of time spent spinning and waiting for a spinlock can undesirably be much higher than the amount of time spent holding the lock. Additionally, the second scenario can result in an avalanche effect resulting in repeating the second scenario multiple times. For example, with the second scenario, all waiting threads can be spinning for a long period of time before the pre-empted thread noted above is scheduled for execution again. The initial occurrence of the second scenario can increase the probability that some other spinning waiting thread will also be preempted by the scheduler and become the next bottleneck.

The foregoing second scenario can generally be characterized as more problematic and more likely to occur than the foregoing first scenario. Simple unfair spinlocks such as noted above do not result in the second scenario that can occur with fair spinlocks. However, using a simple unfair spinlock is generally not acceptable in highly contentious systems since starvation can also occur.

To overcome at least the foregoing drawbacks of the fair spinlock such as with the above-noted second scenario, the techniques of the present disclosure can be utilized.

In at least one embodiment, the techniques of the present disclosure use a fair spinlock that is a FIFO queue-based spinlock. In at least one embodiment, the techniques of the present disclosure use a fair spinlock that is a ticketing spinlock to provide protection against thread pre-emption such as in the second scenario above, where the pre-empted thread can be the next waiting spinning thread that will acquire the spinlock.

In at least one embodiment, the techniques of the present disclosure provide for detecting the occurrence of the second scenario such as noted above where the next waiting thread in the spinlock FIFO queue is pre-empted and the current lock holder releases the spinlock. For example in at least one embodiment where the FIFO queue includes, in FIFO order, the spinning waiting threads 4, 5 and 6 as noted above, the next waiting thread is thread 4, and the techniques of the present disclosure provide for determining when waiting thread 4 has been pre-empted and when another thread 3, the current spinlock holder, releases the spinlock while pre-empted thread 4 is inactive or not executing. In at least one embodiment, the foregoing second scenario can be detected by the waiting thread 5 immediately following the pre-empted inactive thread 4 in the FIFO queue ordering. In at least one embodiment, responsive to detecting the second scenario instance, the next waiting thread 5 of the FIFO queue can also perform processing to acquire the spinlock and thus prevent the previously pre-empted thread 4 from immediately acquiring the spinlock once thread 4 is rescheduled for execution. In at least one embodiment, thread 5 can also save information indicating that thread 4's position in the FIFO queue waiting to acquire the spinlock was effectively cancelled by thread 5's spinlock acquisition. The saved information can be used by the pre-empted thread 4 when it resumes execution (e.g., when next scheduled) such that i) thread 4 recognizes its FIFO queue waiting position has been cancelled, and ii) thread 4 can then subsequently perform processing to once again attempt to acquire the spinlock. In at least one embodiment, thread 4 can generally repeat or restart processing to acquire the spinlock including waiting in the FIFO queue at a next position in the FIFO ordering if the spinlock is not free. Thus in at least one embodiment, the rescheduled previously pre-empted thread 4 can obtain a new position or index in the FIFO queue at the tail end of the queue based on the FIFO ordering. In at least one embodiment, waiting threads can be removed from the head of the FIFO queue based on the FIFO ordering or position in the queue.

In at least one embodiment, the threads in the FIFO queue waiting to acquire the spinlock can have corresponding FIFO queue positions or indices denoted by corresponding consecutive sequentially increasing integers such as 1, 2, 3, and so on, where waiting threads can acquire the spinlock in consecutive increasing sequential order of their corresponding queue positions or indices. Waiting threads can be placed in the FIFO queue of the spinlock based on the order in which the waiting threads attempt to acquire the spinlock.

Waiting threads can generally acquire the spinlock based on their FIFO ordering or position in the FIFO queue. A queue position with a lower index can occur in the FIFO ordering before other positions having a higher index. For example a FIFO queue position or index 1 can denote the first position in the queue of the next waiting thread to acquire the spinlock; index 2 can denote the next consecutive position in the queue following index 1; and so on, so that generally index N+1 denotes the next consecutive position in the queue following index N, where waiting threads can exclusively acquire the spinlock in consecutive sequential order based on the increasing positions or indices in the queue. To further illustrate based on the above, the FIFO queue for the spinlock can include in FIFO order: thread 4 at queue position 1 with an index=1; thread 5 at queue position 2 with an index=2; and thread 6 at queue position 3 with an index=3. In at least one embodiment, the last queue position, such as position or index 3 in the foregoing example, can denote the tail of the queue such that new waiting threads waiting for the spinlock can be added in FIFO order beginning with queue position 4 with an index=4. Queue position 1 in at least one embodiment can denote the head of the queue from which threads are removed. Queue position 3 in the foregoing example can denote the tail or end of the queue where subsequent waiting threads can be added in corresponding subsequent queue entries or positions.

In at least one embodiment for a spinlock with a FIFO queue of spinning waiting threads, the techniques of the present disclosure provide for detecting the occurrence of the above-noted second scenario where i) the spinlock is free and ii) a first waiting thread with the corresponding FIFO queue position or index=1 at the current head of the FIFO ordering has been pre-empted and is inactive, where index 1 can denote the FIFO ordering of the next waiting thread that that can acquire the spinlock. In at least one embodiment, the techniques of the present disclosure provide for a second waiting thread with the corresponding FIFO queue position or index=2 (e.g., the next subsequent second waiting thread in the FIFO ordering following the pre-empted first waiting thread) determining when the first waiting thread at index 1 has been pre-empted and is inactive or not executing and when the spinlock is also free. In at least one embodiment, responsive to the second thread at queue index 2 determining that i) the spinlock is free and ii) the first thread at queue index 1 (e.g., head of the FIFO ordering) has been pre-empted and is inactive or not executing, the techniques of the present disclosure provide for i) the second waiting thread acquiring the spinlock ahead of the pre-empted first waiting thread and ii) the second waiting thread recording information denoting that the pre-empted first thread's position in the queue has been cancelled. Subsequently when the pre-empted first thread is again scheduled for execution, the first thread can use the saved information to recognize that its position in the FIFO ordering or queue was cancelled and then restart acquiring the spinlock. In at least one embodiment if the spinlock is not free when the first thread restarts processing to acquire the spinlock, the first thread performing processing to restart acquiring the spinlock can spin and wait in the FIFO queue at a corresponding index or position at the tail end of the queue.

In at least one embodiment, ticket numbers can be used to denote an order in which threads request or attempt to acquire the spinlock. In at least one embodiment, the ticket numbers used with the spinlock can be an integer sequence of consecutive integers such as beginning with 0. In at least one embodiment, the ticket numbers used with a spinlock can be a monotonically increasing sequence of consecutive integers. In at least one embodiment, the above-noted second waiting thread at FIFO queue position or index 2 can save the first thread's ticket number in the saved information denoting that the pre-empted first thread's position in the queue has been cancelled. Thus the first thread's ticket number can denote a cancelled ticket of the saved information. When the pre-empted first thread is rescheduled for execution, the first thread can compare its ticket number to the cancelled ticket number of the saved information. If the first thread's ticket number matches the cancelled ticket number, the first thread can i) recognize that its ticket number and thus queue position was previously cancelled and ii) restart processing to acquire the spinlock.

The foregoing and other aspects of the techniques of the present disclosure are further described in more detail in the following paragraphs.

In at least one embodiment in a multithreading environment to achieve synchronization, an atomic compare and swap operation can be utilized which includes three inputs: a variable, an old value and a new value where the content of the variable is compared to the old value. The atomic compare and swap operation can atomically perform, in accordance with the three inputs, i) a comparison operation and then ii) a swap operation where the swap operation is performed only if the comparison operation evaluates to true. If the content of the variable matches the old value, the variable is updated to the new value; and otherwise the variable is not updated. In at least one embodiment, the compare and swap operation can return a result or value indicating whether the variable was updated to the new value or not. In at least one embodiment, the return value of the compare and swap operation can be the value read from the variable before the atomic compare and swap operation is performed (e.g., before any potential update to the variable is made to the new value by the operation). The compare and swap operation can be performed as a single atomic operation. If the variable has been updated from the expected old value had been updated by another thread in the meantime, the updating of the variable to the new value fails. For example, consider the atomic operation of compare and swap (lock, free, busy), where: "lock" is the variable, "free" is the old value, and "busy" is the new value, such that execution of the foregoing compares the current value or content of lock to free. If the lock is currently free, the lock is updated to busy and free is returned. If the lock is currently not free (or busy), the lock is not updated and "not free" or busy is returned. Based on the foregoing, a simple spinlock without any fairness mechanism can be denoted by the following pseudo-code:

```
spinlock_lock (Lock) {
    while (compare and swap (Lock, Free, Busy) !=Free)
}
``` to perform a busy wait until the Lock is updated from Free to Busy. Based on the above, the spinlock is acquired by a thread once the thread returns from the spinlock-_lock routine when the lock is updated from free to busy by the executing thread. Otherwise, the thread waits to acquire the spinlock by performing the busy wait by repeatedly executing the while statement until the lock is successfully updated by the compare and swap operation.

In at least one embodiment, the atomic compare and swap operation based on the above-noted semantics can be utilized as discussed elsewhere herein in connection with pseudocode of various routines used in connection with implementation and management of the spinlock.

Referring to FIG. 3A, shown is an example 200 of pseudocode of 3 routines—SpinLock_Init, SpinLock_Acquire, and SpinLock_Release—that can be used to implement a ticketing spinlock in a system that does not use the techniques of the present disclosure.

The routine SpinLock_Init 210 can be invoked to initialize the fields of the spinlock structure including the following fields: now_serving and next_ticket. The line 210*a* initializes now_serving to 0 and the line 210*b* initializes next_ticket to 0. Next_ticket can denote the next available ticket number or queue ticket denoting a thread's position in the FIFO queue of waiting threads. Now_serving can denote the dequeue ticket or queue position of the thread that is allowed to hold or acquire the spinlock.

The routine SpinLock_Acquire 220 can be invoked by each thread attempting to acquire the spinlock. The line 220*a* indicates that fetch and increment is called which i) returns the current value of next_ticket which is then assigned to the local variable my_ticket; and ii) then increments next_ticket. In this example, the fetch and increment of line 220*a* can be performed atomically and therefore not allow any other concurrent attempts at access. My_ticket can denote the ticket value, and thus queue position, of the thread executing the SpinLock_Acquire routine 220. Following 220*a*, line 220*b* can be performed where the executing thread will spin in the while loop while "now_serving" is not equal to the thread's my_ticket value. Once now_serving is equal to the thread's my_ticket value, the thread has acquired the spinlock where control returns from SpinLock-_Acquire. Once the thread returns from SpinLock_Acquire indicating the thread has acquired the spinlock, the thread can enter the corresponding critical section of code.

After the thread completes performing processing of the critical section, the thread can invoke SpinLock_Release 230 which increments (230*a*) now_serving. As a result of performing 230*a*, another thread with the next sequential my_ticket value is allowed to acquire the spinlock and thus allowed to exit from SpinLock_Acquire 220 and enter the critical section. Consistent with other discussion herein, the my_ticket values are assigned (220*a*) to corresponding threads in SpinLock_Acquire 220 in the order in which the threads arrive and attempt to acquire the spinlock (e.g., in the order in which the threads invoke or call SpinLock_Acquire). Since the my_ticket values are acquired by threads in the order of thread arrival or in the order in which the threads attempt to acquire the lock by calling 220, subsequent acquisition of the spinlock is guaranteed to also be in this same FIFO order.

Figure 3B:
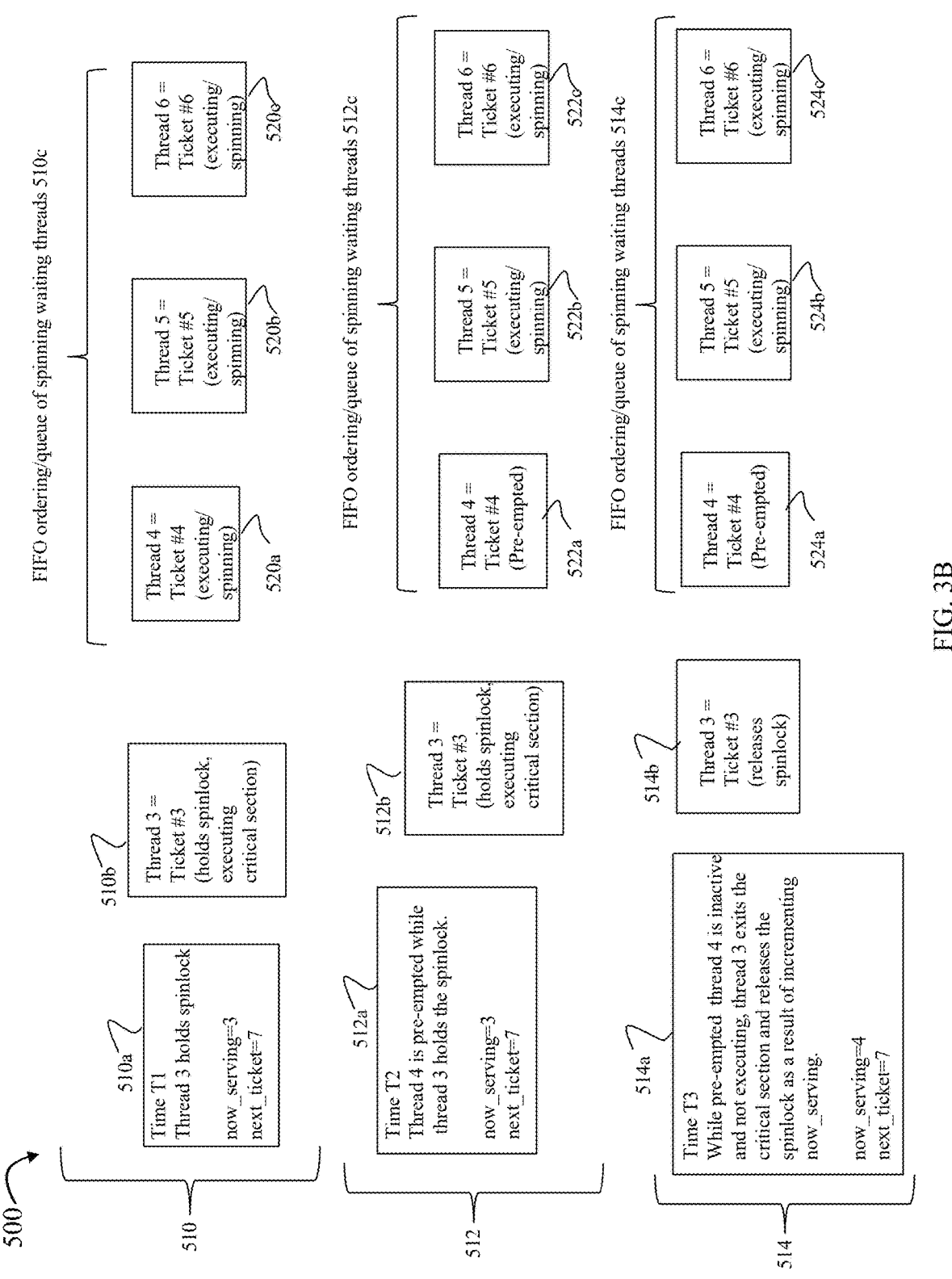
FIG. 3B is an example illustrating a problematic scenario in connection with at least one ticketing spinlock implementation.

To further illustrate the problematic second scenario noted elsewhere herein in connection with a fair spinlock implementation using the pseudocode or logic of FIG. 3A, reference is made to the example 500 of FIG. 3B.

The example 500 illustrates the state of the spinlock and related threads in a system at three consecutive points in time, T1, T2 and T3. Assume that the spinlock implemented is a ticketing spinlock using the routines such as described in connection with FIG. 3A. Each thread N can be assigned or allocated ticket number N as a result of executing line 220*a* of SpinLock_Acquire 220. Thus, the FIFO ordering of threads 520*a*-*c* can be denoted by increasing ticket numbers such that thread 4 520*a* is the next thread to acquire the spinlock once released by thread 3 in accordance with execution of code corresponding to the routines of FIG. 3A.

Element 510 illustrates the state of the spinlock and related threads 3, 4, 5 and 6 (e.g., respectively elements 510*b*, 520*a*-*c*) at time T1. Element 510*a* describes the current state at time T1 where thread 3 510*b* holds the spinlock and can currently be executing the corresponding critical section of code. Additionally as denoted by 510*a*, now_serving=3 and next_ticket=7. Element 510*c* denotes the FIFO ordering or queue of spinning waiting thread 4 520*a*, thread 5 520*b*, and thread 6 520*d* waiting to acquire the spinlock. Thus at time T1: i) thread 3 510*b* has already executed and returned from SpinLock_Acquire 220 thereby acquiring and holding the spinlock where, at time T1, thread 3 510*b* is currently executing the corresponding critical section; ii) threads 4, 5 and 6 (respectively 520*a-c*) are currently executing code of SpinLock_Acquire 220 and are all currently in the busy wait loop executing code of 220*b*.

Element 512 illustrates the state of the spinlock and related threads 3, 4, 5 and 6 at time T2. Element 512*a* describes the current state at time T2 where thread 3 512*b* is still holding the lock and currently executing code of the critical section. At time T2, thread 4 522*a* is pre-empted thereby interrupting or stopping its execution of the busy waiting/spinning (220*b*) of SpinLock_Acquire 220 while thread 3 512*b* holds the spinlock. At time T2, threads 522*b-c* can still be spinning and executing code of 220*b*. Also at time T2 as denoted by 512*a* now_serving=3 and next_ticket=7 (both now_serving and next_ticket remaining unchanged from time T1). Element 512*c* denotes the same FIFO ordering or queue of spinning waiting threads 522*a-c* (respectively threads 4-6) as noted in connection with element 510*c* with the difference that at T2, thread 4 522*a* has been pre-empted. Consistent with other discussion herein, for example, the pre-emption can be the result of the scheduler interrupting execution of thread 4 522*a* to execute another scheduled thread. At some later point in time, the scheduler will again schedule thread 4 for execution. However at time T2, thread 4 522*a* is pre-empted such that its execution of spinning busy wait loop code of 220*b* is interrupted thereby causing thread 4 522*a* to temporarily be inactive or in a state of non-execution (e.g., waiting to be once again scheduled for execution). It should be noted that the pre-emption or interrupting execution of thread 4 can be for any suitable reason. For example, thread 4 may have completed is scheduled time-slice and the scheduler may be pre-empting thread 4 to execute the next scheduled thread. As another example, thread 4 may be pre-empted to execute another thread X based on corresponding priorities of thread 4 and thread X. For example, thread X may have a higher priority than thread 4 and the scheduler or other system component may interrupt execution of thread 4 to execute the higher priority thread X.

Element 514 illustrates the state of the spinlock and related threads 3, 4, 5 and 6 at time T3. Element 514*a* describes the current state at time T3 where thread 3 514*b* completes execution of the critical section and releases the spinlock by executing code of routine SpinLock_Release 230. The spinlock can be released as a result of thread 3 514*b* incrementing now_serving from 3 to 4 so that the next waiting thread (thread 4 524*a*) with ticket number 4 can acquire the spinlock. At time T3, thread 3 514*b* releases the spinlock while thread 4 524*a* is still pre-empted and has not yet been scheduled for continuing execution. At time T3, pre-empted thread 4 524*a* is inactive and not executing. Thus waiting thread 4 524*a* can be characterized as a blocking thread that can block other subsequent waiting threads 524*b-c* (subsequent to thread 4 524*a* in the FIFO ordering 514*c*) from acquiring the spinlock even though the spinlock is now free or available as a result of being released by thread 3 514*b*. At time T3, threads 524*b-c* can still be spinning and executing code of 220*b* while thread 524*a* is inactive (e.g., currently not executing code), and is waiting to be once again scheduled for execution. Also at time T3 as denoted by 514*a*, now_serving=4 and next_ticket=7, whereby next_ticket at T3 remaining unchanged from time T1. Element 514*c* denotes the same FIFO ordering or queue of spinning waiting threads 524*a-c* (respectively threads 4-6) as noted in connection with element 512*c* where thread 4 524*a* has been pre-empted and is still not executing and is inactive. Thus the remaining waiting threads 524*b-c* can continue spinning and waiting despite the spinlock being free. At a later point in time T4 subsequent to time T3, thread 4 524*a* can be rescheduled for execution where thread 4 524*a* can then acquire the spinlock, execute the critical section of code, and then release the spinlock by further incrementing now_serving from 4 to 5. However, it can be undesirable and problematic consistent with other discussion elsewhere herein at time T3 for pre-empted thread 4 to block other waiting spinning threads 5-6 (respectively 524*b-c*) from acquiring the spinlock and further making progress with execution of their corresponding code.

What will now be described is an embodiment of the techniques of the present disclosure using a ticketing spinlock. In at least one embodiment, the techniques of the present disclosure can include improved updated or modified versions of the SpinLock_Acquire and the SpinLock_Release routines of FIG. 3A where the SpinLock_Acquire routine can be invoked by each thread to acquire the spinlock. The improved updated or customized ersions of the SpinLock_Acquire and SpinLock_Release routines as well as others that can be used in at least one embodiment of the techniques of the present disclosure are described below in connection with FIGS. 4, 5A-B and 6. In at least one embodiment, when a thread wants to acquire the spinlock, the thread can execute code of the SpinLock_Acquire routine. In at least one embodiment, when the thread returns from the SpinLock_Acquire routine, the thread has acquired the spinlock and can enter or execute the corresponding critical section of code. In at least one embodiment, once the thread holding the spinlock has completed executing the critical section of code, the thread holding the spinlock can execute SpinLock_Release to release the spinlock and allow a next thread to acquire the spinlock.

In at least one embodiment, the techniques of the present disclosure can use an additional field or variable to indicate an additional piece of state information used by the techniques of the present disclosure. In at least one embodiment, Lock_Taken can be a variable or field that is set (e.g., set to 1 or true) explicitly when the spinlock is taken or acquired by a thread. In at least one embodiment, a thread executing code of SpinLock_Acquire can acquire the spinlock when the executing thread recognizes that its own ticket number is equal to the ticket number denoted by "now_serving", where now_serving denotes the ticket number of the next thread allowed or expected to acquire the spinlock in accordance with the FIFO ordering in which threads attempt to acquire the spinlock. In at least one embodiment, if there are waiting threads, now_serving denotes the next position in the FIFO ordering of the next waiting thread expected to acquire the spinlock. Lock_Taken can be cleared (e.g., 0 or false) when the spinlock is released by a thread holding the spinlock. In at least one embodiment, Lock_Taken can be cleared as part of processing performed in the SpinLock_Release routine. In at least one embodiment, Lock_Taken can be a field, such as a bit field, having a value of 1 when the spinlock is taken, acquired and held by a thread; and can otherwise have a value of 0 (denoting that the spinlock is not taken, not acquired and is free). In at least one embodiment, Lock_Taken can be a field generally included in a spinlock structure. Thus in at least one embodiment, Lock_Taken can denote whether the spinlock is currently held by any thread.

In at least one embodiment, the techniques of the present disclosure include appreciating or recognizing more specifically that now_serving can denote either i) the current ticket holder or thread that currently holds the lock or ii) the ticket holder next allowed to, or expected to, acquire the spinlock in the FIFO ordering even though such ticketholder (having a ticket number equal to now_serving) may not actually have yet acquired the spinlock. Consistent with other discussion herein in at least one embodiment, the techniques of the present disclosure can use Lock_Taken in connection with further identifying whether the spinlock is actually held by/has been acquired by the thread allocated the ticket number equal to now_serving. The FIFO ordering can denote the ordering in which threads attempt to acquire the spinlock such as by invoking SpinLock_Acquire. Thus in at least one embodiment, a thread can or is allowed to acquire the spinlock when now_serving equals the thread's ticket number, or more generally, the thread's position in the FIFO ordering. In at least one embodiment, the state of the spinlock when acquired or held by the thread can be denoted by the combination of i) now_serving being equal to the thread's ticket number or FIFO ordering position and ii) Lock_Taken being set or having a value of 1 (e.g., true). Consistent with discussion herein in at least one embodiment Lock_Taken can be set to 1 or true when a thread acquires or takes the spinlock. In at least one embodiment, Lock_Taken can be set to 1 or true by the thread acquiring the spinlock in response to now_serving being equal to the thread's ticket number or FIFO ordering position.

In at least one embodiment, the techniques of the present disclosure can use Lock_Taken in connection with identifying a problematic scenario such as the second scenario discussed elsewhere herein (such as FIG. 3B) where the next waiting thread, that is next in line in the FIFO ordering to acquire the spinlock, has been pre-empted or interrupted such as by the operating system scheduler. The next waiting thread, such as thread 4 assigned ticket #4 of FIG. 3B, in the FIFO ordering to acquire the spinlock can be pre-empted while another thread such as thread 3 (assigned ticket #3) currently holds the spinlock. The current lock holder thread 3 can then release the spinlock after thread 4 has been pre-empted and prior to thread 4 again being scheduled for execution. Thus thread 3 can release the spinlock by incrementing now_serving from 3 to 4 such that the foregoing next waiting thread (thread 4) next in the FIFO ordering to acquire the spinlock can have a ticket number that is equal to now_serving. However, because thread 4 having the ticket number 4 equal to "now_serving" has been pre-empted and has not yet been rescheduled to resume execution, thread 4 is currently not executing and inactive. As a result, pre-empted waiting thread 4 can block other waiting threads (such as threads 5 and 6 respectively assigned ticket numbers 5 and 6) subsequent in the FIFO order where such other waiting threads may be executing and able to acquire the now free spinlock. In at least one embodiment, the thread having the ticket number of "now_serving+1" (e.g., such as thread 5) can detect the foregoing occurrence of the second scenario where the next waiting thread, thread 4, in the FIFO ordering has been pre-empted or interrupted.

In at least one embodiment, the second scenario, whereby the current lockholder releases the spinlock while the pre-empted next waiting thread having the ticket number "now_serving" (e.g., next waiting thread such as thread 4 in the FIFO ordering to acquire the spinlock) is inactive, can be detected by detecting the occurrence of a corresponding signature of the second scenario. In at least one embodiment within the SpinLock_Acquire routine while spinning and waiting, processing can monitor the number of spin cycles or busy wait loop iterations and if the number exceeds a reasonable threshold, processing can be performed to check for the signature of the second scenario denoting the blocker thread pre-emption scenario as described elsewhere herein (e.g., such as in connection with FIG. 3B). In at least one embodiment, the above-noted reasonable or suitable threshold can be based on the number of spin cycles or busy wait loop iterations occur in 1 microsecond of CPU execution time. In at least one embodiment, the foregoing threshold can be denoted by the N_SPINS_THRESHOLD in the pseudocode of the SpinLock_Acquire routine discussed below in connection with FIG. 5A.

In at least one embodiment, the signature can generally be i) when there are spinlock waiters, and ii) when Lock_Taken is zero or clear for a defined time period such as several CPU cycles or loop iterations. Put another way, the signature can denote the state or conditions of when the spinlock is free, such that no thread holds the spinlock, but still there are waiting threads that are blocked waiting to acquire the spinlock for some defined time period. Thus in at least one embodiment, the above-noted waiting thread, such as thread 5, assigned the ticket number "now_serving+1" can detect the occurrence of the problematic second scenario by repeatedly checking whether i) Lock_Taken is 0 for a specified number of CPU cycles or specified number of loop iterations and ii) thread 5's ticket number remains equal to "now_serving+1". In at least one embodiment, in the SpinLock_Acquire routine, processing can include monitoring the total number of times that the Lock_Taken is 0 while the above-noted waiting thread 5's ticket number is equal to "now_serving+1" (e.g., such that the thread 5 remains spinning and waiting to acquire the spinlock but yet the spinlock is free or not taken or held as denoted by Lock_Taken=0). If the total number of times reaches a specified threshold, processing can determine that the next waiting thread (e.g., thread 4) having the ticket number "now_serving" has been pre-empted (e.g., the thread 4's waiting or spinning in the SpinLock Acquire routine has been interrupted) and not executing when the prior spinlock holder, thread 3, released the spinlock. As a result, pre-empted thread 4 (having ticket number 4"ow_serving") can block or prevent other spinning and waiting threads 5 and 6 from acquiring the spinlock if the spinlock is released, such as by thread 3), while the pre-empted thread 4 is not executing. In at least one embodiment, the check to detect or determine the occurrence of the second scenario can be performed by the waiting thread 5 (e.g., assigned a ticket number equal to "now_serving+1") based on the following logic or check:

```
if (Lock_Taken == 0 &&          /* lock is free AND*/
    pspinlock->my_ticket == pspinlock->now_serving + 1) /* this waiter
    is the next in FIFO after the blocking
                          pre-empted thread */
``` where the foregoing check can be repeated a specified or threshold number of times. In at least one embodiment, if each retry or recheck of the above-noted logic is TRUE, it can be determined that waiting thread 5 (e.g., having the ticket number "now_serving+1" ) is blocked by the prior waiting thread 4 (e.g., having the ticket number "now_serving) that is next in line to acquire the spinlock, where the waiting thread 4 is inactive (e.g., not executing) and has been pre-empted.

In at least one embodiment, once pre-emption of the above-noted thread 4 (e.g., having ticket number "now_serving" is recognized or determined, the waiting thread 5 (e.g., having ticket number "now_serving+1") that is next in line in the FIFO ordering after thread 4 can perform processing (e.g., as included in the SpinLock_Acquire routine) including acquiring the spinlock such as by atomically incrementing now_serving and thereby preventing the pre-empted thread 4 from acquiring the spinlock once the thread 4 is rescheduled for execution. In at least one embodiment, incrementing now_serving results in updating now_serving to be equal to thread 5's ticket number such that thread 5 i) acquires the spinlock and ii) cancels the ticket number and FIFO ordering position of the blocking inactive pre-empted thread 4. In at least one embodiment prior to acquiring the spinlock, thread 5 can also save the cancelled ticket number of the pre-empted thread 4 in saved information. When the pre-empted thread 4 is subsequently rescheduled and resumes execution, thread 4 can perform processing to i) determine that its ticket number or position in the FIFO ordering of spinning waiting threads has been cancelled, and then ii) retry acquiring the spinlock such as by obtaining the next ticket number denoting a new or next position the FIFO ordering of waiting spinning threads to acquire the spinlock. In at least one embodiment, thread 4 can determine that its ticket number has been cancelled by comparing its ticket number to the saved cancelled ticket number of the saved information.

In at least one embodiment, tracking of cancelled tickets can be performed using any suitable technique. In at least one embodiment, tracking of cancelled tickets can be performed by including a field for the cancelled ticket in the spinlock object or structure. This variant or implementation is reflected in the pseudocode of the particular embodiment discussed below. In at least one embodiment, processing can track only a single canceled ticket or allow only a single canceled ticket at a time since the chance of having multiple canceled tickets at the same time may be very low. As a variation, an embodiment can also provide for storing or tracking multiple canceled tickets. In at least one embodiment, a canceled ticket can be included as a field in the spinlock structure. More generally, the one or more canceled tickets that can be tracked or recorded in an embodiment can be stored in any suitable location or structure such as a global variable. For example, in at least one embodiment, an array of cancelled tickets can be maintained as a variable not in the spinlock. In at least one embodiment, the array of cancelled tickets can be globally visible to multiple CPU cores, where each such CPU core can potentially have a cancelled ticket. In at least one embodiment, the size of the array can be N, where N denotes the number of CPU cores that can potentially have a cancelled ticket of a blocker pre-empted thread (e.g., such as thread 4 described in connection with FIG. 3B). In at least one embodiment, N can denote the maximum number of concurrent spinlocks, one per CPU core, allowed for use with the techniques of the present disclosure. In at least one embodiment, the array of size N (e.g., with N entries, cells or elements) can include one entry corresponding to each of the N CPU cores where the corresponding one entry can store the cancelled ticket number, if any, for the corresponding CPU core.

In at least one embodiment, it may be possible for a variable, field or location, such as next_ticket, tracking the ticket numbers, to overflow or cycle back to zero such that ticket numbers can be reused. Although ticket numbers in at least one embodiment can be integers assigned or allocated in consecutive sequential order, the field such as next_ticket tracking the ticket numbers can be a finite size capable of representing a specified finite range of values. As a result in at least one embodiment, additional processing can be performed to handle overflow of next_ticket (e.g., next-_ticket exceeding its maximum representable value of the range) resulting in next_ticket cycling back to the starting or original value such as 0 where ticket numbers of the sequence can then be reused. Details of such processing to handle the possible reuse of a cancelled ticket number in at least one embodiment are described in more detail below.

In at least one embodiment, a single cancelled ticket can be allowed such that there can only be one cancelled ticket at a time. In such an embodiment, an existing first cancelled ticket number can be recorded in the saved information such as in a field of the spinlock structure for a first pre-empted thread. However, it may be possible for another pre-empted thread with a second ticket number to be detected before the pre-empted first thread is rescheduled and reacquires the spinlock. In such a case in at least one embodiment, the other latter pre-empted thread will not have its second ticket number cancelled and will rather continue to block subsequent waiting threads of the FIFO ordering. However, it should be noted that the probability of such an occurrence can be extremely low. Alternatively in at least one embodiment, multiple canceled tickets can be allowed, tracked and stored in which case the second ticket number canceled may also be stored along with the first canceled ticket. For example in at least one embodiment, the global array of cancelled tickets as noted above can be utilized that does allow canceling multiple blocking pre-empted threads.

In at least one embodiment as discussed below, Lock-_Taken can be implemented as the most significant bit (MSB) of the now_serving field of the spinlock structure. However, more generally, Lock_Taken can be implemented in any suitable manner such as a separate field.

The techniques of the present disclosure are described in more detail in the following paragraphs in at least one embodiment with a fair lock that is a ticketing spinlock. However, more generally, the techniques of the present disclosure can be used with other types of fair spinlocks and is not limited to using ticket numbers of a ticketing spinlock. For example, the techniques of the present disclosure can also be used in connection with other spinlock implementations such as core-bitmask based spinlocks.

Figure 4:
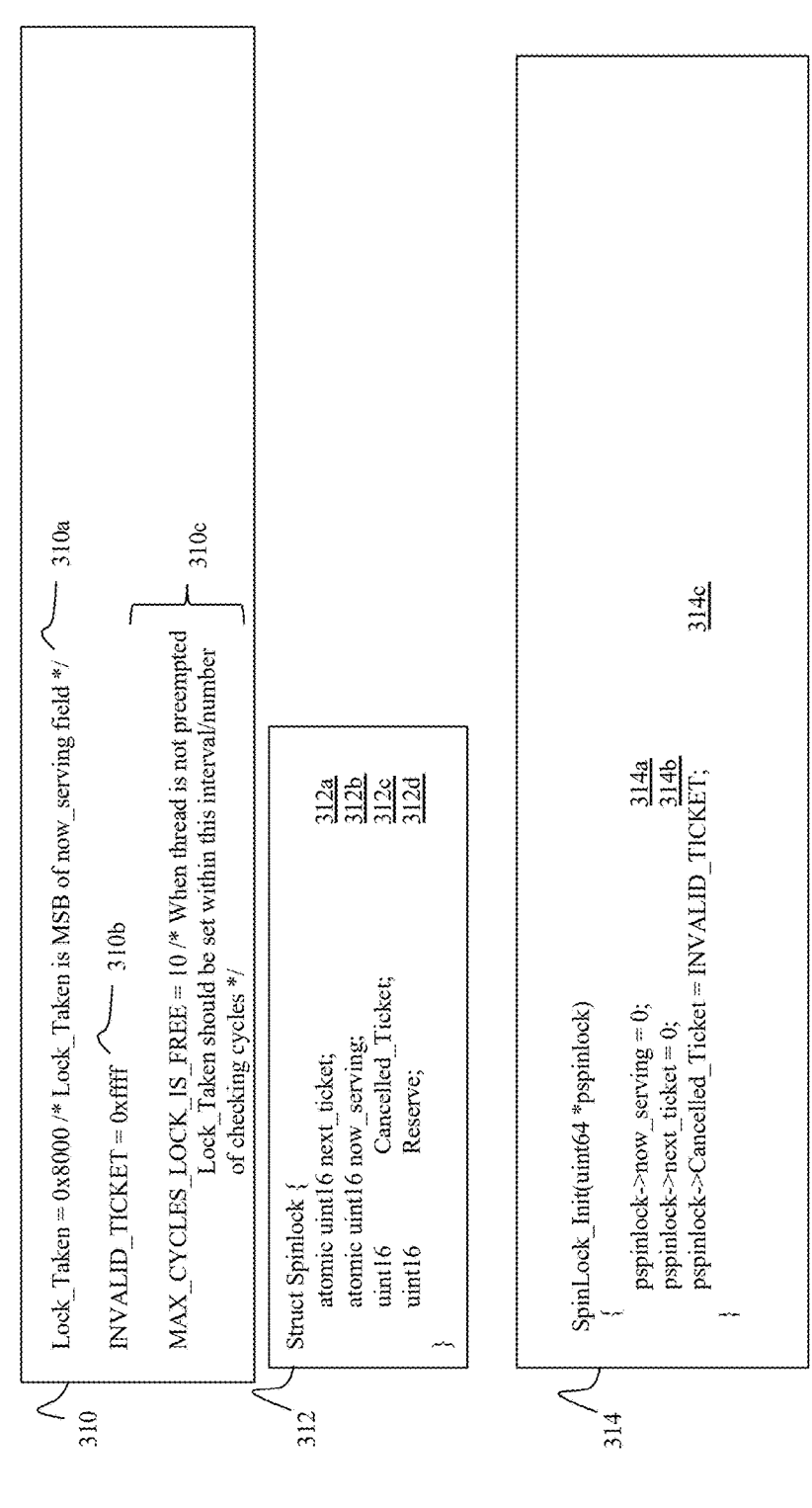

Referring to FIG. 4, shown is an example 300 of pseudo-code that can be used in at least one embodiment of the techniques of the present disclosure.

The example 300 includes definitions 310 and 312 that can be used in at least one embodiment in accordance with the techniques of the present disclosure. The element 310 defines constant values used in subsequent routines. The line 310*a* defines the constant value, Lock_Taken, as 0x8000 (hexadecimal) to denote that the variable Lock _Taken can be implemented as the MSB of the now_serving field of the spinlock structure described below. Alternatively in at least one embodiment, Lock_Taken can be a separate variable or field, such as of the spinlock structure. In at least one embodiment, Lock_Taken can be a field, such as a bit field or Boolean, having a value of 1 when the spinlock is taken or acquired and otherwise having a value of 0 (e.g., when the spinlock is not taken, not acquired or is free). The line 310*b* defines the constant INVALID_TICKET as denoting an invalid or impossible ticket number such as 0xffff (hexadecimal). The element 310*c* defines the constant MAX_CY-CLES_LOCK_IS_FREE to be 10, where MAX_CY-CLES_LOCK_IS_FREE denotes a threshold number of cycles or iterations used in connection with detecting an occurrence of the second problematic scenario discussed elsewhere herein where the thread next in line in the FIFO order to acquire the spinlock is pre-empted. In at least one embodiment, when the thread next in line is not pre-empted, Lock_Taken should be set to 1 within the threshold number of checking cycles or iterations denoted by MAX_CY-CLES_LOCK_IS_FREE. It should be noted that although 10 is used for illustration purposes in this example, more generally MAX_CYCLES_LOCK_IS_FREE can generally be any suitable integer value.

The element 312 defines the spinlock structure including the following fields: next_ticket 312*a*, now_serving 312*b*, cancelled_ticket 312*c* and reserved 312*d*. Generally, field 312*d* can be reserved and used, for example, for alignment purposes such that the spinlock structure 312 is 64 bit aligned. Generally, the field next_ticket 312*a* and the now_serving field 312*b* can be similar to corresponding fields discussed in connection with FIG. 3A with differences or additions discussed below. The next_ticket field 312*a* can denote the next ticket number that is available for allocation or assignment to a thread attempting to acquire the spinlock. The now_serving field 312*b* can denote the ticket number of the thread that is next to acquire the spinlock. Next_ticket 312*a* can denote the next available ticket number or queue ticket denoting a thread's position in the FIFO queue of waiting threads. Now_serving 312*b* can denote the dequeue ticket or queue position of the thread that is next to acquire the spinlock. Consistent with other discussion herein in at least one embodiment, the MSB position of the now_serving field can be Lock_Taken. Alternatively, Lock_Taken can be a separate field or variable such as, for example, a separate field of the spinlock structure 312. The cancelled ticket field 312*c* can store the ticket number of the currently cancelled ticket, if any. The cancelled ticket field 312*c* can be used in connection with the techniques herein to handle processing in connection with a detected occurrence of the second scenario where the next waiting thread (e.g., second thread with ticket number=now_serving) inline in the FIFO ordering to acquire the spinlock has been pre-empted and is inactive when the spinlock is released by the current spinlock holder. In this case, the cancelled ticket number 312*c* can denote the ticket number currently assigned to or allocated to the foregoing second thread whose ticket number or FIFO queue waiting position has been canceled.

The element 314 can represent pseudocode of processing performed by the routine SpinLock_Init to initialize the fields of the spinlock structure 312. Line 314*a* initializes now_serving to 0. Line 314*b* initializes next_ticket to 0. Line 314*c* initializes cancelled ticket to INVALID_TICKET. SpinLock_Init 314 can be invoked prior to invoking the SpinLock_Acquire or SpinLock_Release routines such as discussed below in connection with FIGS. 5A-B and FIG. 6. Consistent with other discussion herein the routine Spin-Lock_Acquire such as described in connection with FIGS. 5A-B can be invoked by each thread attempting to acquire the spinlock. Once now_serving is equal to the thread's my_ticket value, the thread has acquired the spinlock where control returns from SpinLock_Acquire. Once the thread returns from SpinLock_Acquire indicating the thread has acquired the spinlock, the thread can enter the corresponding critical section of code. After the thread holding the spinlock completes performing processing of the critical section, the thread can invoke SpinLock_Release as described in connection with FIG. 6 to perform processing including releasing the spinlock and accordingly resetting or clearing Lock-_Taken.

FIGS. 5A and 5B include pseudocode denoting processing performed in at least one embodiment of the SpinLock-_Acquire routine in accordance with the techniques of the present disclosure.

The example 400 of FIG. 5A represents a first portion of pseudocode of processing performed in at least one embodiment of the SpinLock_Acquire routine in accordance with the techniques of the present disclosure, and the example 401 of FIG. 5B represents a second portion of pseudocode of processing performed in at least one embodiment of the SpinLock_Acquire routine in accordance with the techniques of the present disclosure. In the example 400, an input parameter to the SpinLock_Acquire routine is *pspinlock denoting a pointer to a spinlock structure as described by 312 of FIG. 4.

In the example 400, the SpinLock_Acquire routine begins with a first label, Restart, at line 402 which is referenced in connection with subsequent processing. Element 404 includes code that initializes the variable do_not_cancel to FALSE and n_spins to 0. N_spins denotes a counter used in subsequent processing to count the number of spins or busy wait loop iterations performed. The variable do_not_cancel can be used in subsequent processing to track whether an allocated or assigned ticket number (e.g., assigned to my_ticket below as the next_ticket number) has been reused as a result of overflow of the next_ticket field of the Spinlock structure, where next_ticket tracks the ticket numbers and denotes the value of the next consecutive ticket number in the integer sequence to be allocated or assigned to a thread denoting the thread's FIFO ordering or position in the wait queue. The possibility of overflow of the next_ticket field resulting in reuse or restarting the ticket numbers of the next_ticket field from 0 is discussed above which can further result in possible reuse of a cancelled ticket number.

Following the initialization 404, control proceeds to line 406 where the current thread executing the SpinLock_Acquire routine can obtain the next available ticket number denoted by the current value of the next_ticket field of the spinlock structure. Additionally, the current ticket number in the next_ticket field can be updated and incremented by 1. Line 406 includes "my_ticket=fetch_and_increment(pspinlock->next_ticket)" which performs an atomic fetch and increment which i) returns the current value of next_ticket which is then assigned to the local variable my_ticket; and ii) then increments next_ticket. In this example, the fetch and increment of line 406 can be performed atomically and therefore not allow any other concurrent attempts at access. My_ticket can denote the assigned ticket number ir value, and thus queue position, of the thread executing the Spin-Lock_Acquire routine in the example 400.

Following line 406, control proceeds to line 408 which clears (e.g., sets to 0) the MSB of my_ticket. Following line 408, control proceeds to 410.

Element 410 includes pseudocode that checks (410*a*) whether the allocated ticket, my_ticket, matches a previously canceled ticket number stored in the Cancelled_Ticket field of the spinlock structure. If so, it means that the allocated ticket number assigned to my_ticket in 406 is a reuse of the canceled ticket number due to overflow of the next_ticket field. With the overflow of the next_ticket field in at least one embodiment, the same sequence of ticket numbers can be reused beginning with ticket number 0 in the next_ticket field, whereby the current ticket number just assigned to my_ticket in 406 should not be cancelled. As a result in 410, if (my_ticket==pspinlock->Cancelled_Ticket) (e.g., if my_ticket is equal to the canceled ticket), then do_not_cancel=TRUE so that subsequent processing described below does not cancel the ticket number of the currently executing thread assigned my_ticket in 406 even if my_ticket is equal to Cancelled_Ticket. Thus in 410*b* the do_not_cancel flag is set to TRUE to avoid cancelling the ticket number of the current thread now executing and just assigned my_ticket in 406.

Following processing of 410, control proceeds to the outer while loop at line 412 that performs the spinning or busy wait and other processing described below. The outer while loop 412 includes an if then else statement where the if-then portion is denoted by 414 and the else portion includes pseudocode spanning inclusively from line 416a of FIG. 5A to line 416b in FIG. 5B. Line 412 indicates that while now_serving is not equal to my_ticket, keep repeatedly executing the if then else statement denoted by 414, 416 and 416b. Put another way, line 412 indicates that while the current thread's FIFO ordering or queue position denoted by my_ticket is not yet allowed to acquire the spinlock in that is it not yet the current thread's turn in accordance with the FIFO ordering, repeatedly execute the if then else statement denoted by 414, 416 and 416b. Once the outer while loop 412 condition evaluates to false such that now_serving equals my_ticket, control proceeds to 460 of FIG. 5B discussed below.

---

Element 414 includes the following pseudocode:
if (n_spins < N_SPINS_THRESHOLD) {
    n_spins++;
    pause;

--- which is the busy waiting or spinning loop iteration of the outer while loop 412. In 414b, n_spins counts the number of times or iterations the busy waiting of 414c is performed as part of the outer while loop 412.

Rather than continually spin with busy waiting until the spinlock is acquired by the thread such as in connection FIG. 3A, the techniques of the present disclosure monitor the number of times, n_spins, the busy waiting of 414 is performed by incrementing n_spins (414b) each time the "then" portion of 414 is performed (as a result of the n_spins being less than N_SPINS_THRESHOLD in 414a). When n_spins reaches the threshold such that the condition "n_spins<N_SPINS_THRESHOLD" 414a evaluates to false, the else portion beginning at line 416a is alternatively performed.

Generally, the pseudocode of the else portion spanning from line 416a to 416b can be executed when the spinning or busy waiting of then portion 414 is determined to have executed beyond an expected reasonable amount of time or iterations denoted by the threshold N_SPINS_THRESHOLD. In this case, processing of the else portion spanning from 416a-416b can be performed to determine whether i) the current thread's ticket was previously cancelled or ii) there is an occurrence of the second scenario where the waiting thread next inline to acquire the spinlock (e.g., assigned a ticket number="ow_serving") has been pre-empted and is now inactive.

If (n_spins<N_SPINS_THRESHOLD) 414a evaluates to false, the else portion of pseudocode is executed beginning with 418. Element 418 performs processing to determine whether the currently executing thread (currently executing SpinLock_Acquire) had its ticket number previously cancelled (418a). Consistent with other discussion herein, if the current thread's ticket number was previously canceled, the current thread was previously a pre-empted blocker thread of the second scenario that is now resuming executing after being rescheduled. If the current thread's ticket number, my_ticket, is i) equal to Cancelled_Ticket and ii) do_not-_cancel is FALSE (e.g., 418a condition is true), then the current thread can clear Cancelled_Ticket (410b) and perform processing to retry acquiring the spinlock (e.g., transfer control to Restart at line 402 as denoted by line 418c). For example assume pre-empted blocking thread 4 of FIG. 3B had its ticket number previously canceled by thread 5 and now thread 4 has resumed execution. In this case, thread 4 would execute 418 and determine that its ticket number=4 matches the Canceled_Ticket such that thread 4 would clear the Canceled_Ticket (418b) and then transfer control to Restart at line 402 (418c).

After performing processing of 418 if the thread's ticket number was not previously cancelled (e.g., condition of 418a evaluates to false such that 418b-c is not executed), then control proceeds to 420 of FIG. 5B to commence processing to determine whether the second scenario is detected where the next waiting thread inline to acquire the spinlock has been pre-empted and is inactive or not executing even though the spinlock is free (e.g., such that the next waiting thread inline is a blocker thread blocking execution of other spinning, executing waiting threads waiting to acquire the spinlock.

In 420, processing is performed to initialize i) the counter n_check_cycles to MAX_CYCLES_LOCK_IS_FREE (420a) and ii) the counter n_cycles_lock_is_not_taken to 0 (420b), where both of the foregoing counters are used in subsequent processing.

Following 420, control proceeds to perform processing of the while loop 422. In 422, processing is performed for a number of times or while loop (422) iterations to detect the occurrence of the second scenario in accordance with the signature discussed elsewhere herein. The while loop 422 can provide for ensuring that the signature or state of the second scenario of pre-empted thread 4 as in FIG. 3B persists for some defined period of time corresponding to multiple loop iterations. While loop 422 generally includes an if statement (422a-d) that checks for the signature of the second scenario and then decrements n_check_cycles (422e). In 422, a check for the signature is performed up to a maximum number of times denoted by MAX_CY-CLES_LOCK_IS_FREE, where the check determines whether i) the spinlock is free (e.g., has not been taken or acquired) (422b) and ii) "now_serving+1" is equal to my_t-icket (the ticket number assigned to the currently executing thread) (422c). The condition of line 422c evaluates whether the currently executing thread holds the next consecutive FIFO ordering or queue position following the blocking pre-empted inactive thread (having an assigned ticket number equal to "now_serving"). If the conditions denote by 422b-c both evaluate to true, then n_cycles_lock_is_not-_taken is incremented by 1 (line 422d). Following the if statement (422b-d), n_check_cycles is decremented by 1 (422e).

Following 422, control proceeds to the if statement 424 which determines that if during all the checks performed in the while loop 422 that the spinlock was not taken or acquired, it is determined that there is an occurrence of the second scenario such as illustrated in FIG. 3B. With reference back, for example, to FIG. 3B illustrating the second scenario, thread 5 may perform the processing of 422 and 424 that determines, during the multiple repeated checks of 422, that i) the spinlock has not been taken (as denoted by Lock_Taken being equal to 0) and ii) it, thread 5, is the next thread inline in the FIFO queue or ordering subsequent to the blocking waiting thread 4 (where thread 4 that has not taken the spinlock even though it is next inline in the FIFO ordering that can acquire the spinlock).

At line 424a, if (n_cycles_lock_is_not_taken==MAX_CYCLES_LOCK_IS_FREE) then the condition evaluates to true denoting that the second scenario is detected, where thread 5 determines that thread 4 is inactive and was preempted and has not taken the spinlock even though it (thread 4) is next inline in the FIFO ordering to acquire the spinlock. As a result of the condition of 424a evaluating to true, thread 5 can perform processing of the if statements 426 and 428 in connection with thread 5 acquiring the spinlock ahead of the blocking pre-empted thread 4. Generally, the processing performed by 426 and 428 can save the blocking thread 4's ticket number as the cancelled ticket. In the particular embodiment illustrated in FIG. 5B as discussed above, only a single canceled ticket number may be tracked and saved but it may be possible to have multiple canceled tickets. In this particular embodiment where there is only a single canceled ticket number saved, if there is already a valid saved canceled ticket number of another blocking thread, then the ticket number of blocking thread 4 cannot be saved. Rather in this latter instance if there is already a valid saved canceled ticket number in Cancelled_Ticket, then i) thread 4's ticket number is not canceled/not saved as a canceled ticket number; ii) thread 4 will continue to block subsequent waiting threads until thread 4 is resumes execution and acquires and then releases the spinlock; and iii) currently executing thread 5 will not now acquire the spinlock and rather will continue to spin. As a variation in at least one embodiment there can also be multiple canceled tickets tracked and saved thereby allowing for thread 4's canceled ticket to be saved along with an existing canceled ticket number.

In if statement 426, line 426a determines whether the Canceled_Ticket field is free. If the condition "pspinlock->Cancelled_Ticket!=INVALID_TICKET" evaluates to true thereby denoting the Canceled_Ticket field is not free, then line 426b is performed where the currently executing thread 5 keeps spinning. In at least one embodiment, control can be transferred from line 426b to the spinning label at line 411. Thus if, for example, thread 5 determines that there is already an existing stored canceled ticket whereby the condition of 426a is true, thread 5 can transfer control from 426b to spinning 411 to continue spinning without saving thread 4's ticket number.

If the canceled ticket slot is free whereby the condition of 426a evaluates to false, control proceeds to 428. At 428, processing is performed such as by thread 5 to cancel the blocking thread 4's ticket number and increment now_serving such that now_serving after the increment is equal to thread 5's ticket number so that thread 5 can acquire the spinlock.

Since there are other concurrently executing threads, to avoid any possible race conditions, the currently executing thread 5 atomically updates now_serving using the atomic compare and swap operation 428a (e.g., (compare_and_swap(pspinlock->now_serving, my_ticket-1, my_ticket)==my_ticket-1)). The compare and swap operation of 428a determines if now_serving=my_ticket-1. If so, then now_serving is updated to my_ticket. The compare and swap operation of 428a returns the value of now_serving before performing the compare and swap operation. Thus if now_serving does not equal my_ticket-1, now_serving is not updated and the executing thread continues to spin in the outer while loop 412.

If the foregoing update of now_serving as performed by 428a is successful and completed, then processing of lines 428b-c is performed. In line 428b processing is performed to cancel the ticket number of the blocking thread, such as thread 4, by saving thread 4's ticket number (as denoted by "my_ticket-1") in the Canceled_Ticket field of the spinlock structure. In this example, thread 5 can be executing and performing the processing of 428 where my_ticket=5 and where performing 428 results in ticket number 4 of thread 4 being stored (428b) in the Canceled_Ticket field thereby canceling blocking inactive pre-empted thread 4's position in the FIFO ordering. Following 428b, line 428c is executed to break thread 5's execution out of the outer while loop 412 resulting in transfer of control to 460 following 412a.

At 460, thread 5 accordingly sets Lock_Taken to true or 1 to denote that it has taken or acquired the spinlock. Following 460, thread 5 returns from SpinLock_Acquire. In 460, thread 5 can set Lock_Taken atomically (e.g., to avoid any possible race condition such as with the pre-empted thread 4 resuming execution) with a recheck of the expected value of now_serving being equal to my_ticket (e.g., ticket number 5 such as previously set by thread 5 by the compare and swap operation of 428a. In the particular embodiment of FIG. 5B at line 460a:

"compare_and_swap(pspinlock->now_serving, my ticket, (my_ticket|Lock_Taken))" logically and atomically compares now_serving to my_ticket. If now_serving equals my_ticket, then update now_serving to have its MSB (most significant bit field) denoting Lock_Taken to be 1 or true, and otherwise (if now_serving does not equal my_ticket), Lock_Taken is not updated/not set to 1 or true. The compare and swap operations of 460 returns the value of now_serving prior to performing the compare and swap operation. Thus if now_serving equals my_ticket, the compare and swap returns a ticket number equal to my_ticket whereby the If condition of 460a evaluates to false and processing returns from SpinLock Acquire (e.g., SpinLock_Acquire has completed resulting in the return). However, if now_serving does not equal my_ticket, the compare and swap returns a ticket number not equal to my_ticket whereby the If condition of 460a evaluates to true resulting in performing line 460b which transfers control to Spinning 411 of FIG. 5A.

Referring to FIG. 6, shown is an example 501 of pseudo-code denoting processing that can be performed by the SpinLock_Release routine in at least one embodiment in accordance with the techniques of the present disclosure. Generally, the SpinLock_Release routine 501 can perform processing to i) increment now_serving by 1 so that another thread having the next ticket number in the FIFO order can acquire the spinlock; and ii) clear Lock_Taken (where Lock_Taken is updated to 0) to denote that the spinlock is not taken and is released. In at least one embodiment, the foregoing updates to now_serving and Lock_Taken in 502 can be performed atomically. Processing of line 460a can be performed allow the next thread in the FIFO ordering to acquire the spinlock. In at least one embodiment where the Lock_Taken field is the MSB of the now_serving field, the now_serving and Lock_Taken fields can both be updated using a single operation such as denoted by 502. In another embodiment where Lock_Taken and now_serving are implemented as two separate fields or variables, the foregoing updates to now_serving and Lock_Taken in 502 can be performed atomically (e.g., as a single transaction) such that the values of now_serving and Lock_Taken either i) both reflect their respective values as prior to the atomic update operation, or alternatively ii) both reflect their respective values after performing the atomic update operation.

Referring to FIGS. 7A and 7B, shown is a flowchart 600, 601 of processing steps that can be performed in at least one embodiment in accordance with the techniques of the present disclosure. The flowchart 600, 601 summarizes processing discussed above such as, for example, in connection with FIG. 3B to recognize or detect the problematic second scenario where the techniques of the present disclosure, such as discussed above, for example, in connection with FIGS. 4, 5A, 5B and 6, can be utilized to further handle or resolve the detected second scenario.

At the step 602, thread 3 acquires and holds the spinlock and executes code of the corresponding critical section of code associated with the spinlock. Thread 3 acquires the spinlock after invoking and returning from SpinLock_Acquire (e.g., FIGS. 5A-B). As noted below and also described in connection with FIG. 3B, thread 3 can be assigned position or index=3 in the FIFO ordering in which threads attempt to acquire the spinlock. The state ST1 of thread 3 acquiring or holding the spinlock can be denoted by i) now_serving=3, and ii) Lock_Taken=1 or true, where now_serving and Lock_Taken can be accordingly updated in SpinLock_Acquire as executed by thread 3 prior to returning from SpinLock_Acquire. From the step 602, control proceeds to the step 604.

At the step 604, While thread 3 is the current spinlock holder, 3 other threads—thread 4, thread 5, and thread 6—attempt to acquire the spinlock but cannot since the spinlock is not free and is currently held by thread 3. As a result, the 3 other threads wait to acquire the spinlock while executing code of the SpinLock_Acquire routine. The FIFO ordering in which the threads attempt to acquire the spinlock can be: thread 3, thread 4, thread 5, and thread 6, where threads can acquire the spinlock based on their relative positions in the FIFO ordering. The 3 waiting threads (e.g., threads 4-6) can wait to acquire the spinlock on a queue, where each waiting thread has a position on the queue based on the thread's position in the FIFO ordering. In this example, thread 4 is the next waiting spinning thread inline in the FIFO ordering for acquiring the spinlock. Thread 5 is further the next consecutive waiting spinning thread in the FIFO ordering following thread 4. Thread 6 is the next consecutive waiting spinning thread in the FIFO ordering following thread 6. Thus, based on the FIFO ordering, the following denotes the sequential consecutive order in which waiting threads are expected to acquire the spinlock: thread 4, thread 5 and then thread 6. For illustration purposes, assume that: thread 3 has position or index 3 in the FIFO ordering; thread 4 has position or index 4 in the FIFO ordering; thread 5 has position or index 5 in the FIFO ordering; and thread 6 has position or index 6 in the FIFO ordering. In this example, each thread can be expected to acquire the spinlock based on the consecutive increasing integer ordering of the positions or indexes denoting the FIFO ordering. From the step 604, control proceeds to the step 606.

At the step 606, while thread 3 holds the spinlock, thread 4 is pre-empted such as by an operating system scheduler. As a result, thread 4's execution state transitions from active (e.g., executing or spinning while waiting) to inactive (e.g., not executing). Thus pre-empted thread 4 is inactive or not executing while waiting to acquire the spinlock at its corresponding position 4 in the FIFO ordering. From the step 606, control proceeds to the step 608.

At the step 608, while thread 4 is waiting and inactive, thread 3 releases the spinlock such that the spinlock can now be acquired by another thread, such as the next waiting thread in the FIFO ordering. Based on the FIFO ordering, thread 4 is the next thread that can acquire the spinlock after thread 3. However, thread 4 is inactive and therefore currently unable to execute code of SpinLock_Acquire to acquire the free spinlock. While waiting thread 4 is inactive and while the spinlock is free, thread 5 can be executing and spinning in the SpinLock_Acquire routine waiting to acquire the spinlock.

At this point in step 608, thread 4 can be characterized as a blocking or blocker thread that is blocking or preventing thread 5, the next executing waiting thread in the FIFO ordering following blocking thread 4, from acquiring the free spinlock.

In at least one embodiment, the state ST2 of thread 3 releasing the spinlock can be denoted by i) now_serving=4 (e.g., where, and ii) Lock_Taken=0 or false such that now_serving denotes the FIFO ordering position or index of the next thread to acquire the spinlock.

In at least one embodiment, thread 3 can execute code of SpinLock_Release that transitions from the state ST1 to ST2 by i) incrementing now_serving from 3 to 4, and ii) updating Lock_Taken from 1 to 0. From the step 608, control proceeds to the step 610.

At the step 610, thread 5 (e.g., the next executing waiting thread in the FIFO ordering immediately following the blocking pre-empted thread 4), can perform processing that detects when the spinlock is free while there are also threads (including thread 5) waiting to acquire the spinlock. The foregoing state of the spinlock being free while there are also threads waiting to acquire the spinlock can denote a signature of the second scenario, where the thread 4 that is next in line to acquire the spinlock can be inactive such as a result of having been pre-empted such that pre-empted thread 4 is now blocking other waiting threads, such as thread 5, from acquiring the spinlock.

In at least one embodiment, thread 5 can detect the occurrence of the foregoing signature by detecting that i) the spinlock is free and also ii) thread 5 remains waiting (e.g., waiting in its current position or index 5 in the FIFO ordering) such as for some specified threshold amount of time or for a specified number of repeated checks.

In at least one embodiment, thread 5 can detect the occurrence of the foregoing signature of the second scenario of the blocking pre-empted thread 4 by determining the persistence of the following two conditions for some specified amount of time or number of repeated checks: i) Lock_Taken is equal to 0, and ii) now_serving+1 is equal to 5, denoting the index or position in the FIFO ordering assigned to thread 5, the next consecutive index or position in the FIFO ordering following the index or position 4 of the pre-empted blocking thread 4.

In at least one embodiment, thread 5 can detect the occurrence of the foregoing signature as part of processing performed in the SpinLock_Acquire routine. In response, thread 5 can further perform processing in the SpinLock_Acquire routine: i) that cancels thread 4's position in the FIFO ordering or queue (e.g., remove thread 4 from its current position 4 in the FIFO ordering or queue); ii) that stores or saves thread 4's canceled position or FIFO ordering index (e.g., saves thread 4's index=4); and iii) that results in thread 5 acquiring the spinlock (e.g., such that thread 5 completes its current execution of the SpinLock_Acquire routine and returns from the SpinLock_Acquire routine).

The state ST3 of thread 5 acquiring or holding the spinlock can be denoted by i) now_serving=5, and ii) Lock_Taken=1 or true, where now_serving and Lock_Taken can be accordingly updated in SpinLock_Acquire as executed by thread 5 prior to returning from SpinLock_Acquire. In at least one embodiment, thread 5 can execute code of SpinLock_Acquire that transitions from the state ST2 to the state ST3 by incrementing now_serving from 4 to 5 and setting Lock_Taken to 1. From the step 610, control proceeds to the step 612.

At the step 612, pre-empted (e.g., inactive) thread 4 can subsequently be rescheduled for execution and can thus resume execution of the SpinLock_Acquire routine (e.g., such as from the point where thread 4 was previously pre-empted or interrupted). Thread 4 can determine that its prior position 4 in the FIFO ordering was canceled, such as bydetermining its assigned position or index 4 is equal to the saved or canceled position or index 4. Responsive to determining its position in the FIFO ordering was canceled, thread 4 can repeat processing or restart processing to acquire the spinlock. In at least one embodiment, thread 4 can transfer control to the beginning or start of SpinLock-_Acquire such as at Restart 402 such that thread 4 obtains a new next position or index in the FIFO ordering. For example, assuming the tail or last position or index in the FIFO ordering is 6, thread 4 can be assigned position or index 7 in the FIFO ordering following thread 6 (assigned index 6).

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:
1. A computer-implemented method comprising:
a first thread TH1 acquiring a spinlock;
while TH1 holds the spinlock, a second thread TH2 and a third thread TH3 each attempting to acquire the spinlock;
responsive to TH2 and TH3 attempting to acquire the spinlock while held by TH1, adding TH2 and TH3 to a queue of threads waiting to acquire the spinlock, wherein TH2 and TH3 are added to the queue based on a FIFO (first in first out) ordering in which threads attempt to acquire the spinlock, where TH1 has a first position or index P1 in the FIFO ordering, TH2 has a second position or index P2 in the FIFO ordering consecutively following TH1, and TH3 has a third position or index P3 in the FIFO ordering consecutively following TH2;
while TH1 holds the spinlock, pre-empting TH2 so that TH2 becomes inactive;
while TH2 is inactive and waiting at the second position or index P2 in the FIFO ordering of the queue, TH1 releasing the spinlock so that the spinlock is free;
detecting that the spinlock is free and that TH3 is waiting in the queue at the third position or index P3 immediately following the second position or index P2 of TH2, where TH2 is next, in the FIFO ordering of threads in the queue, to acquire the spinlock after released by TH1;
responsive to said detecting, determining that TH2 is inactive and has been pre-empted, and performing first processing including:
saving a copy of the second position or index P2 in saved information;
cancelling the second position or index P2 of TH2 in the FIFO ordering; and
TH3 acquiring the spinlock;
subsequent to said canceling, rescheduling TH2 for execution; and
responsive to said rescheduling, TH2 resuming execution, wherein said TH2 resuming execution includes TH2 performing second processing including:
determining, using the copy of the second position or index P2, that the second position or index P2 of TH2 in the FIFO ordering is canceled; and
responsive to determining that the second position or index P2 of TH2 in the FIFO ordering is canceled, assigning TH2 a fourth position or index P4 in the FIFO ordering, wherein P4 has a corresponding position or index in the FIFO ordering subsequent to the third position or index P3.

2. The computer-implemented method of claim 1, wherein P4 denotes a position or index in the FIFO ordering at a tail or end of the FIFO ordering such that all threads having corresponding indices less than P4 occur in the FIFO ordering prior to TH2 such that all threads having corresponding indices less than P4 are expected to acquire the spinlock prior to TH2.

3. The computer-implemented method of claim 1, wherein said detecting is performed by TH3 having the second position or index P2 immediately following the first position or index P1 of TH2.

4. The computer-implemented method of claim 3, wherein said detecting includes repeatedly checking a specified number of times that i) the spinlock is free or not taken, and ii) TH3 is waiting in the queue at the third position or index P3 immediately following the second position or index P2 of TH2.

5. The computer-implemented method of claim 4, wherein the FIFO ordering is a sequence of consecutive integers such that threads attempting to acquire the spinlock are each assigned a next consecutive integer in the sequence in accordance with an order in which the threads attempt to acquire the spinlock.

6. The computer-implemented method of claim 5, wherein while TH1 holds the spinlock, a first variable, now_serving, is equal to the first position or index P1 of TH1, and a second variable, lock_taken, is 1 or true to denote the spinlock is taken or held by a corresponding thread TH1 having the first position or index P1 as indicated by now_serving.

7. The computer-implemented method of claim 6, wherein said TH1 releasing the spinlock includes:
incrementing now_serving from P1 to P2 denoting that TH2, having the second position or index P2, is a next thread following TH1 allowed to acquire the spinlock in accordance with the FIFO ordering; and
updating lock_taken to 0 or false to denote that the spinlock is free and not taken thereby denoting that the spinlock is available for acquisition by a next thread.

8. The computer-implemented method of claim 7, wherein said detecting includes:
determining whether lock_taken is 0; and determining whether a first quantity, now_serving +1, is equal to the third position or index P3 of TH3.

9. The computer-implemented method of claim 8, wherein said TH3 acquiring the spinlock includes:

incrementing now_serving from P2 to P3 denoting that TH3, having the third position or index P3, is a next thread allowed to acquire the spinlock in accordance with the FIFO ordering; and updating lock_taken to 1 or true to denote that the spinlock taken or held by a corresponding thread TH3 having the third position or index P3 as indicated by now_serving.

10. The computer-implemented method of claim 1, further comprising:

subsequent to TH1 acquiring the spinlock, TH1 executing a first critical code section that includes updating one or more data items that are only allowed to be updated by a single thread at a time.

11. The computer-implemented method of claim 10, wherein each of TH1, TH2 and TH3 includes a corresponding critical code section the updates said one or more data items whose access is serially synchronized using the spinlock such that a corresponding thread is required to acquire and hold the spinlock in order to provide the corresponding thread with exclusive access to the one or more data items accessed in the corresponding critical code section.

12. The computer-implemented method of claim 10, wherein subsequent to TH1 completing execution of the first critical code section, said TH1 releasing the spinlock so that the spinlock is free.

13. The computer-implemented method of claim 1, wherein TH1 and TH2 are added to the queue, in said adding, at a first point in time where TH1 and TH2 are waiting in the queue each executing code in a busy wait loop.

14. A system comprising:

one or more processors; and a memory comprising code stored thereon that, when executed, performs a method comprising:

a first thread TH1 acquiring a spinlock;

while TH1 holds the spinlock, a second thread TH2 and a third thread TH3 each attempting to acquire the spinlock;

responsive to TH2 and TH3 attempting to acquire the spinlock while held by TH1, adding TH2 and TH3 to a queue of threads waiting to acquire the spinlock, wherein TH2 and TH3 are added to the queue based on a FIFO (first in first out) ordering in which threads attempt to acquire the spinlock, where TH1 has a first position or index P1 in the FIFO ordering, TH2 has a second position or index P2 in the FIFO ordering consecutively following TH1, and TH3 has a third position or index P3 in the FIFO ordering consecutively following TH2;

while TH1 holds the spinlock, pre-empting TH2 so that TH2 becomes inactive;

while TH2 is inactive and waiting at the second position or index P2 in the FIFO ordering of the queue, TH1 releasing the spinlock so that the spinlock is free;

detecting that the spinlock is free and that TH3 is waiting in the queue at the third position or index P3 immediately following the second position or index P2 of TH2, where TH2 is next, in the FIFO ordering of threads in the queue, to acquire the spinlock after released by TH1;

responsive to said detecting, determining that TH2 is inactive and has been pre-empted, and performing first processing including:

saving a copy of the second position or index P2 in saved information;

cancelling the second position or index P2 of TH2 in the FIFO ordering; and

TH3 acquiring the spinlock;

subsequent to said canceling, rescheduling TH2 for execution; and responsive to said rescheduling, TH2 resuming execution, wherein said TH2 resuming execution includes TH2 performing second processing including:

determining, using the copy of the second position or index P2, that the second position or index P2 of TH2 in the FIFO ordering is canceled; and responsive to determining that the second position or index P2 of TH2 in the FIFO ordering is canceled, assigning TH2 a fourth position or index P4 in the FIFO ordering, wherein P4 has a corresponding position or index in the FIFO ordering subsequent to the third position or index P3.

15. A non-transitory computer-readable media comprising code stored thereon that, when executed, performs a method comprising:

a first thread TH1 acquiring a spinlock;

while TH1 holds the spinlock, a second thread TH2 and a third thread TH3 each attempting to acquire the spinlock;

responsive to TH2 and TH3 attempting to acquire the spinlock while held by TH1, adding TH2 and TH3 to a queue of threads waiting to acquire the spinlock, wherein TH2 and TH3 are added to the queue based on a FIFO (first in first out) ordering in which threads attempt to acquire the spinlock, where TH1 has a first position or index P1 in the FIFO ordering, TH2 has a second position or index P2 in the FIFO ordering consecutively following TH1, and TH3 has a third position or index P3 in the FIFO ordering consecutively following TH2;

while TH1 holds the spinlock, pre-empting TH2 so that TH2 becomes inactive;

while TH2 is inactive and waiting at the second position or index P2 in the FIFO ordering of the queue, TH1 releasing the spinlock so that the spinlock is free;

detecting that the spinlock is free and that TH3 is waiting in the queue at the third position or index P3 immediately following the second position or index P2 of TH2, where TH2 is next, in the FIFO ordering of threads in the queue, to acquire the spinlock after released by TH1;

responsive to said detecting, determining that TH2 is inactive and has been pre-empted, and performing first processing including:

saving a copy of the second position or index P2 in saved information;

cancelling the second position or index P2 of TH2 in the FIFO ordering; and

TH3 acquiring the spinlock;

subsequent to said canceling, rescheduling TH2 for execution; and responsive to said rescheduling, TH2 resuming execution, wherein said TH2 resuming execution includes TH2 performing second processing including:

determining, using the copy of the second position or index P2, that the second position or index P2 of TH2 in the FIFO ordering is canceled; and responsive to determining that the second position or index P2 of TH2 in the FIFO ordering is canceled, assigning TH2 a fourth position or index P4 in the FIFO ordering, wherein P4 has a corresponding position or index in the FIFO ordering subsequent to the third position or index P3.

\* \* \* \* \*